United States Patent
Taguchi et al.

(10) Patent No.: US 12,111,146 B2
(45) Date of Patent: Oct. 8, 2024

(54) OPTICAL MEASUREMENT APPARATUS AND OPTICAL MEASUREMENT METHOD

(71) Applicant: Otsuka Electronics Co., Ltd., Osaka (JP)

(72) Inventors: Kunikazu Taguchi, Hirakata (JP); Suguru Irie, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 91 days.

(21) Appl. No.: 17/119,216

(22) Filed: Dec. 11, 2020

(65) Prior Publication Data

US 2021/0223028 A1    Jul. 22, 2021

(30) Foreign Application Priority Data

Jan. 20, 2020 (JP) .................................. 2020-6699
Oct. 5, 2020 (JP) ............................... 2020-168239

(51) Int. Cl.
  *G01B 11/06* (2006.01)
  *G02B 5/30* (2006.01)
(52) U.S. Cl.
  CPC ........ *G01B 11/0625* (2013.01); *G02B 5/3025* (2013.01)
(58) Field of Classification Search
  CPC .................................................. G01B 11/0625
  See application file for complete search history.

(56) References Cited

U.S. PATENT DOCUMENTS

| 5,343,293 | A | * | 8/1994 | Berger | G01B 11/065 356/369 |
| 7,573,582 | B2 | | 8/2009 | Mikami | |
| 8,319,966 | B2 | | 11/2012 | Zawaideh et al. | |
| 9,545,197 | B2 | * | 1/2017 | Korb | A61B 3/14 |
| 10,551,166 | B2 | * | 2/2020 | Ygartua | G01B 11/0641 |
| 11,193,882 | B2 | * | 12/2021 | Hidaka | G01J 9/02 |
| 2019/0107384 | A1 | | 4/2019 | Ygartua et al. | |
| 2019/0258043 | A1 | * | 8/2019 | Kuebler | G02B 21/06 |

FOREIGN PATENT DOCUMENTS

| JP | S63-163105 A | 7/1988 |
| JP | 2009-198361 A | 9/2009 |
| JP | 2011-133428 A | 7/2011 |

(Continued)

OTHER PUBLICATIONS

An Office Action; "Notice of Reasons for Refusal," mailed by the Japanese Patent Office on Feb. 27, 2024, which corresponds to Japanese Patent Application No. 2020-168239 and is related to U.S. Appl. No. 17/119,216; with English language translation.

*Primary Examiner* — Rebecca C Bryant
(74) *Attorney, Agent, or Firm* — Studebaker & Brackett PC

(57) ABSTRACT

An optical measurement apparatus including: an irradiation optical system configured to irradiate a measurement subject with irradiation light that includes a plurality of wavelengths; a reception optical system configured to receive measurement light that is transmission light or reflection light travelling from the measurement subject as a result of the measurement subject being irradiated with the irradiation light; and a polarizing plate, wherein the polarizing plate is configured to be able to be provided in either the irradiation optical system or the reception optical system.

6 Claims, 24 Drawing Sheets

(56) References Cited

FOREIGN PATENT DOCUMENTS

| | | |
|---|---|---|
| JP | 2012-112760 A | 6/2012 |
| JP | 5266787 B2 | 8/2013 |
| JP | 5482195 B2 | 4/2014 |
| JP | 5585837 B2 | 9/2014 |
| JP | 2015-059750 A | 3/2015 |
| JP | 6239909 B2 | 11/2017 |

* cited by examiner

OPTICAL MEASUREMENT APPARATUS AND OPTICAL MEASUREMENT METHOD

CROSS-REFERENCE TO RELATED APPLICATION

This application is based upon and claims the benefit of priority from Japanese patent application No. 2020-6699, filed on Jan. 20, 2020, and Japanese patent application No. 2020-168239, filed on Oct. 5, 2020, the disclosure of which are incorporated herein in their entirety by reference.

BACKGROUND OF THE INVENTION

Field of the Invention

The present invention relates to an optical measurement apparatus and an optical measurement method.

Description of Related Art

In recent years, a technique has been known for measuring the film thickness of a measurement subject, for example, by measuring the transmittance or the reflectance of the measurement subject based on transmission light or reflection light travelling from the measurement subject as a result of the measurement subject being irradiated with light.

For example, JP 2015-59750A (Patent Document 1) discloses a film thickness measurement method as described below. That is, the film thickness measurement method includes: a step of irradiating a measurement subject with continuous light to obtain an optical spectrum of reflected light or transmission light therefrom; a step of obtaining a power spectrum from the optical spectrum by performing Fourier transform; and a step of obtaining a film thickness of the measurement subject with respect to a split peak appearing in the power spectrum, based on a midpoint between a first characteristic point for a shortest wavelength peak and a second characteristic point for a longest wavelength peak.

Also, J P 2009-198361A (Patent Document 2) discloses a film thickness measurement apparatus as described below. That is, the film thickness measurement apparatus is a film thickness measurement apparatus that includes: a measurement unit that measures an optical spectrum by splitting reflected light or transmission light obtained by irradiating a measurement subject with white light; and a computing unit that measures a film thickness of the measurement subject by performing a predetermined calculation on the optical spectrum measured by the measurement unit. The computing unit includes: a first conversion unit that converts an optical spectrum in a preset wavelength band of the optical spectrum into a wavenumber range optical spectrum so as to be rearranged at predetermined wavenumber intervals; a second conversion unit that converts the wavenumber range optical spectrum converted by the first conversion unit into a power spectrum; and a calculation unit that obtains a position of a center of gravity of a peak appearing in the power spectrum converted by the second conversion unit, and obtains the film thickness of the measurement subject based on the position of the center of gravity.

Also, J P 2011-133428A (Patent Document 3) discloses a retardation measurement apparatus as described below. That is, the retardation measurement apparatus is a retardation measurement apparatus that irradiates a measurement subject with polarized light to measure retardation of the measurement subject by using light returned from the measurement subject, the retardation measurement apparatus including: a light source that outputs white light to irradiate the measurement subject therewith; a polarizing plate that polarizes output light from the light source and into which light returned from the measurement subject enters; a spectroscopic unit to which light that has returned from the measurement subject and that has passed through the polarizing plate enters, and that generates an optical spectrum of the light; and a calculation unit to which the optical spectrum generated by the spectroscopic unit is input, and that calculates retardation from the optical spectrum and outputs the retardation.

Also, J P 2012-112760A (Patent Document 4) discloses a film thickness measurement method as described below. That is, the film thickness measurement method is a film thickness measurement method for measuring a film thickness of a measurement subject that has birefringence, the film thickness measurement method including: a step of irradiating the measurement subject with polarized light, splitting light passing through the measurement subject to generate an optical spectrum, and measuring retardation from the optical spectrum; and a step of calculating the film thickness of the measurement subject from the measured retardation and a refractive index difference of the measurement subject.

For example, Patent Document 1 discloses that two peaks that correspond to two different optical film thicknesses of a measurement subject appear in the power spectrum of the optical spectrum of reflected light or transmission light from the measurement subject. With the techniques disclosed in Patent Document 1 and Patent Document 2, it may be impossible to accurately determine the film thickness of the measurement subject based on such a power spectrum.

There is demand for a technique that makes it possible to more accurately measure the transmittance or reflectance of the measurement subject than such techniques disclosed in Patent Documents 1 to 4.

SUMMARY OF THE INVENTION

The present invention has been made to solve the above-described problems, and an object thereof is to provide an optical measurement apparatus and an optical measurement method that can more accurately measure the transmittance or the reflectance of a measurement subject.

(1) To solve the above-described problem, an optical measurement apparatus according to one aspect of the invention includes: an irradiation optical system configured to irradiate a measurement subject with irradiation light that includes a plurality of wavelengths; a reception optical system configured to receive measurement light that is transmission light or reflection light travelling from the measurement subject as a result of the measurement subject being irradiated with the irradiation light; and a polarizing plate, wherein the polarizing plate is configured to be able to be provided in either the irradiation optical system or the reception optical system.

As described above, with the configuration that includes a polarizing plate that is configured to be able to be provided in either an irradiation optical system or a reception optical system and with which the measurement subject is irradiated with irradiation light passing through the polarizing plate, or measurement light passing through the polarizing plate is received, it is possible to measure a transmittance spectrum or a reflectance spectrum in which a beat component is reduced, in the case of measuring the transmittance spectrum or reflectance spectrum of the measurement subject that has birefringence, for example. Also, it is possible to prevent the light reception intensity of the measurement light in the reception optical system from decreasing, when compared with a configuration in which the polarizing plate is provided in both the irradiation optical system and the reception optical system. Therefore, it is possible to more accurately measure the transmittance or the reflectance of a measurement subject.

(2) Preferably, the polarizing plate is fixedly provided in only one of the irradiation optical system and the reception optical system.

With such a configuration, it is unnecessary to perform an operation such as moving the position of the polarizing plate when measuring the transmittance or the reflectance of the measurement subject. Therefore, it is possible to start the measurement of the transmittance or the reflectance of the measurement subject with a simple configuration and simple operation.

(3) Preferably, the optical measurement apparatus further includes an adjustment unit configured to be able to adjust a direction in which an absorption axis of the polarizing plate extends in a plane that intersects a light path of the irradiation light or a light path of the measurement light.

With such a configuration, it is possible to adjust the direction in which the absorption axis of the polarizing plate extends, relative to the optical axis of the measurement subject that has birefringence, and it is possible to reduce the beat component included in the generated transmittance spectrum or reflectance spectrum.

(4) To solve the above-described problem, an optical measurement method according to one aspect of the invention is an optical measurement method performed by using an optical measurement apparatus that includes an irradiation optical system and a reception optical system, the optical measurement method includes: a step of irradiating a measurement subject with irradiation light that includes a plurality of wavelengths, by using the irradiation optical system; and a step of receiving measurement light that is transmission light or reflection light travelling from the measurement subject as a result of the measurement subject being irradiated with the irradiation light, by using the reception optical system, wherein, in the step of irradiating the measurement subject with the irradiation light or the step of receiving the measurement light, the measurement subject is irradiated with the irradiation light passing through a polarizing plate, or the measurement light passing through a polarizing plate is received.

As described above, with the method in which the measurement subject is irradiated with irradiation light passing through the polarizing plate, or measurement light passing through the polarizing plate is received, it is possible to measure a transmittance spectrum or a reflectance spectrum in which a beat component is reduced, in the case of measuring the transmittance spectrum or reflectance spectrum of the measurement subject that has birefringence, for example. Also, it is possible to prevent the light reception intensity of the measurement light in the reception optical system from decreasing, when compared with a configuration in which the polarizing plate is provided in both the irradiation optical system and the reception optical system. Therefore, it is possible to more accurately measure the transmittance or the reflectance of a measurement subject.

(5) Preferably, the polarizing plate is fixedly provided in only one of the irradiation optical system and the reception optical system.

With such a configuration, it is unnecessary to perform an operation such as moving the position of the polarizing plate when measuring the transmittance or the reflectance of the measurement subject. Therefore, it is possible to start the measurement of the transmittance or the reflectance of the measurement subject with a simple configuration and simple operation.

(6) Preferably, the optical measurement method further includes a step of calculating a film thickness of the measurement subject based on a result of receiving the measurement light in each of cases where directions in which an absorption axis of the polarizing plate extends in a plane that intersects a light path of the irradiation light or the measurement light are different.

With such a configuration, in the case of measuring the film thickness of a measurement subject that has birefringence, for example, it is possible to more accurately measure the film thickness of the measurement subject by using the result of reception of measurement light when the polarizing plate is placed so that the direction in which the absorption axis extends is parallel with the slow axis of the measurement subject and the result of reception of measurement light when the polarizing plate is placed so that the direction in which the absorption axis extends is parallel with the fast axis of the measurement subject.

According to the present invention, it is possible to more accurately measure the transmittance or the reflectance of a measurement subject.

The foregoing and other objects, features, aspects and advantages of the present invention will become more apparent from the following detailed description of the present invention when taken in conjunction with the accompanying drawings.

Figure 1:
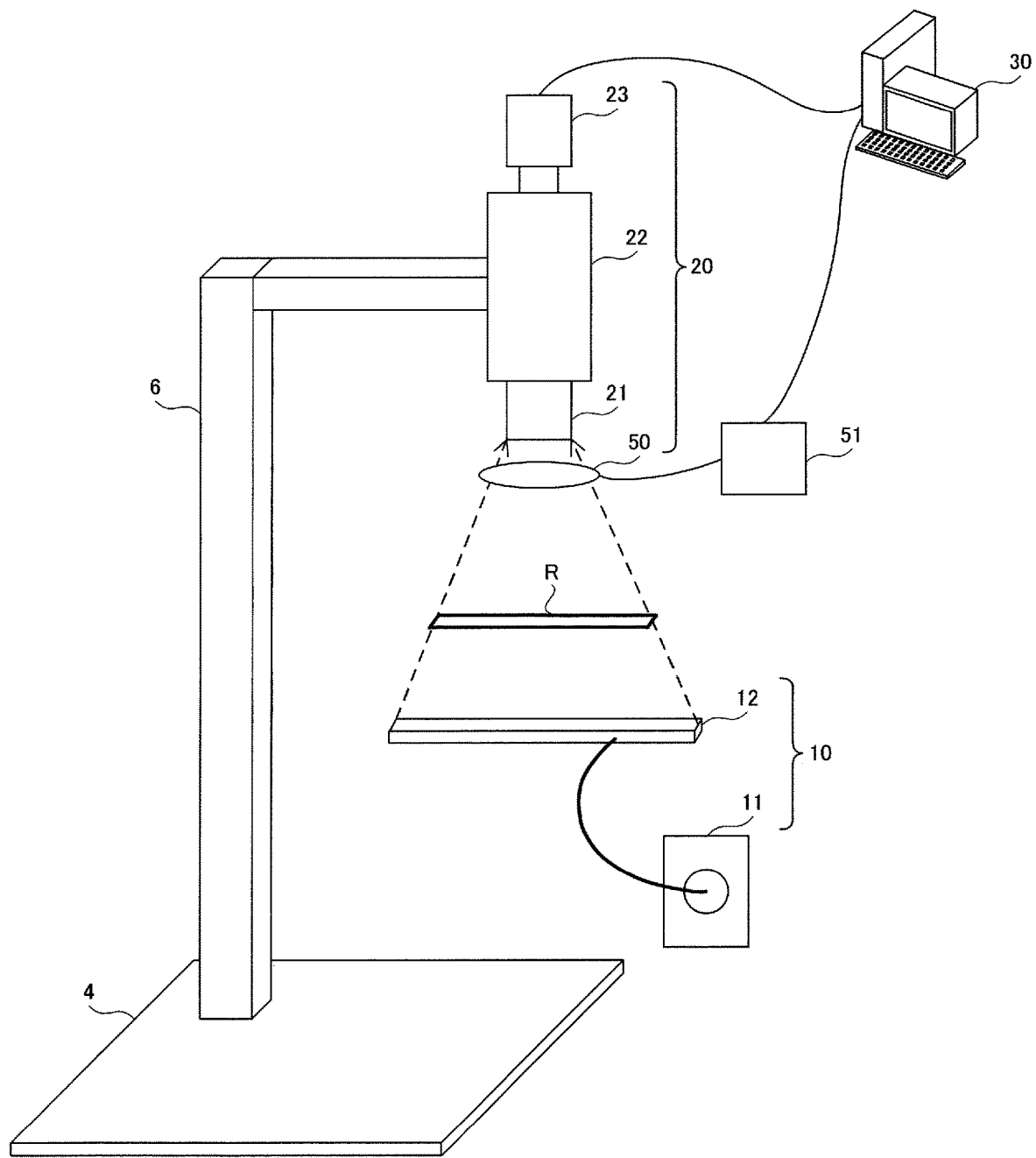
FIG. 1 is a diagram showing an example of a configuration of an optical measurement apparatus according to a first embodiment of the present invention.

Hereinafter, embodiments of the present invention will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

DETAILED DESCRIPTION OF THE INVENTION

First Embodiment

Optical Measurement Apparatus

FIG. 1 is a diagram showing an example of a configuration of an optical measurement apparatus according to a first embodiment of the present invention.

As shown in FIG. 1, an optical measurement apparatus 101 includes an irradiation optical system 10, a reception optical system 20, a processing device 30, an adjustment unit 51, a base member 4, a support member 6, and a polarizing plate 50. The base member 4 and the support member 6 fix the reception optical system 20. Note that the optical measurement apparatus 101 is not limited to having a configuration that includes the base member 4 and the support member 6, and may include other members for fixing the reception optical system 20 instead of the base member 4 and the support member 6 or in addition to the base member 4 and the support member 6.

The polarizing plate 50 is configured such that it can be located in either the irradiation optical system 10 or the reception optical system 20. For example, the polarizing plate 50 is fixedly provided in only one of the irradiation optical system 10 and the reception optical system 20. In the example shown in FIG. 1, the polarizing plate 50 is fixedly provided only in the reception optical system 20.

Figure 2:
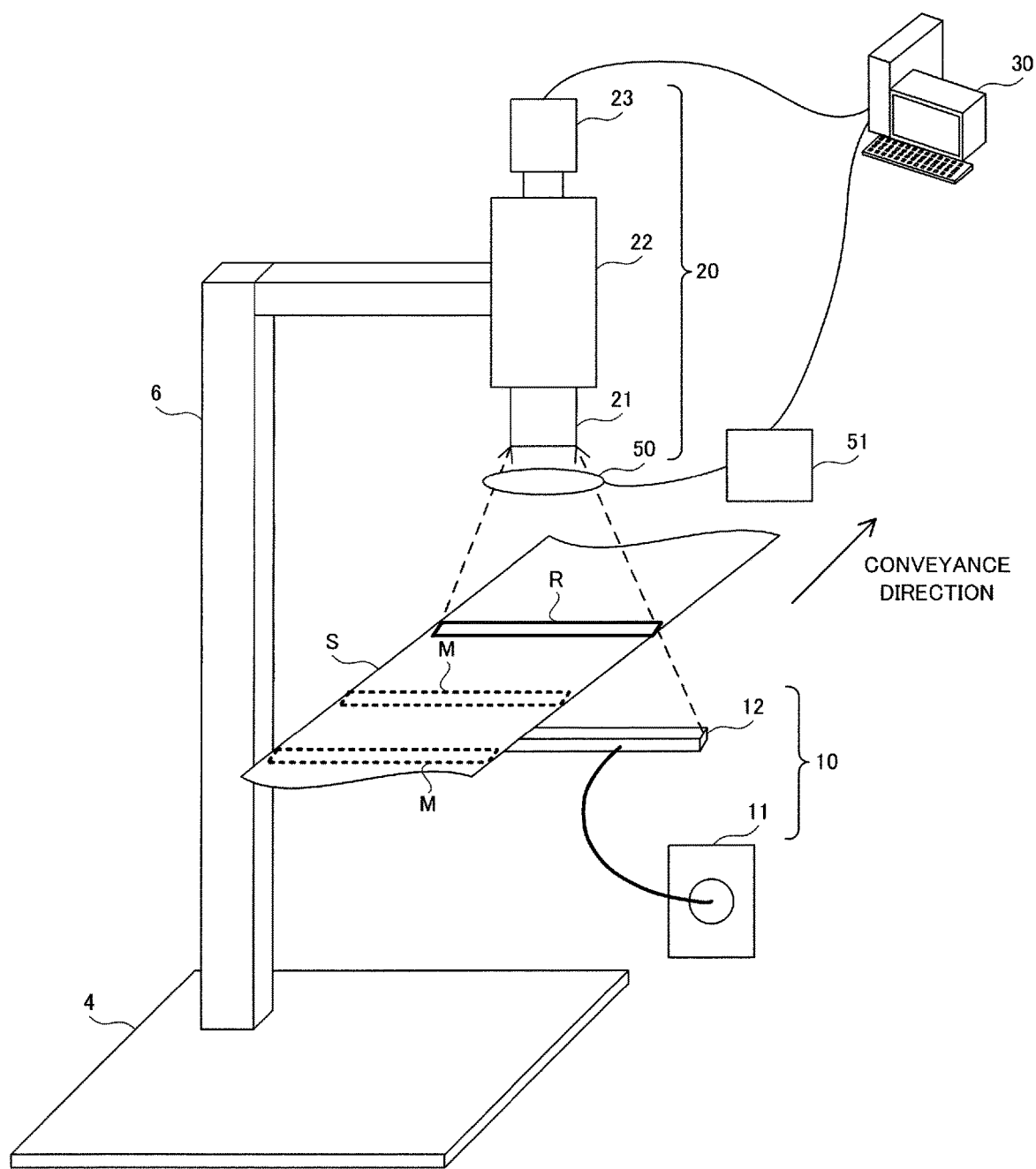
FIG. 2 is a diagram showing an example of a configuration of the optical measurement apparatus according to the first embodiment of the present invention.

FIG. 2 is a diagram showing an example of a configuration of the optical measurement apparatus according to the first embodiment of the present invention. FIG. 2 shows a state in which a measurement subject S that is the subject of measurement performed by the optical measurement apparatus 101 is placed.

As shown in FIG. 2, the optical measurement apparatus 101 measures the transmittance of the measurement subject S such as a film that is moved across a target area R.

For example, in a production line of the measurement subject S, the optical measurement apparatus 101 automatically measures the transmittance spectrum of the measurement subject S that is conveyed through the target area R, at a plurality of measurement positions M. That is to say, the optical measurement apparatus 101 performs in-line measurement of the transmittance spectrum at the plurality of measurement positions M on the measurement subject S.

More specifically, the optical measurement apparatus 101 periodically performs transmittance measurement, for example, to calculate the transmittance for each wavelength at the measurement positions M on the measurement subject S that is conveyed.

Irradiation Optical System

The irradiation optical system 10 irradiates the measurement subject S in a straight direction, with irradiation light that includes a plurality of wavelengths. More specifically, the irradiation optical system 10 irradiates, with irradiation light, a target area R that is a linear area across which the measurement subject S is moved.

The irradiation optical system 10 includes a light source 11 and a line light guide 12.

The light source 11 emits light that includes a plurality of wavelengths. The spectrum of light emitted by the light source 11 may be a continuous spectrum or a line spectrum. The wavelengths of light emitted by the light source 11 are set according to, for example, the range of wavelength information that is to be acquired from the measurement subject S. The light source 11 is a halogen lamp, for example.

The line light guide 12 receives light emitted from the light source 11 and emits the received light from a linear opening. Thus, the line light guide 12 irradiates the target area R with irradiation light in a straight direction. For example, a diffusion member for reducing unevenness in the amount of light is provided on the emission surface of the line light guide 12 from which irradiation light is emitted. The line light guide 12 is provided immediately below the surface on which the measurement subject S is conveyed.

For example, when performing in-line measurement of the transmittance spectrum of the measurement subject S, the irradiation optical system 10 irradiates the target area R with irradiation light at measurement points in time that are points in time when measurement is performed, while the irradiation optical system 10 stops irradiating the target area R with irradiation light at points in time other than the measurement points in time. Note that the irradiation optical system 10 may continuously irradiate the target area R with irradiation light regardless of the measurement points in time.

Reception Optical System

The reception optical system 20 receives measurement light that is transmission light travelling from the measurement subject S as a result of the measurement subject S being irradiated with irradiation light.

The reception optical system 20 includes the polarizing plate 50, an objective lens 21, an imaging spectroscope 22, and an imaging unit 23.

The reception optical system 20 is located so as to face the line light guide 12 with the measurement subject S being interposed therebetween.

The reception optical system 20 receives, as measurement light, transmission light passing through the target area R, of the irradiation light emitted from the line light guide 12. Specifically, the reception optical system 20 receives transmission light passing through the measurement subject S that is moved across the target area R, of the irradiation light emitted from the line light guide 12.

Figure 3:
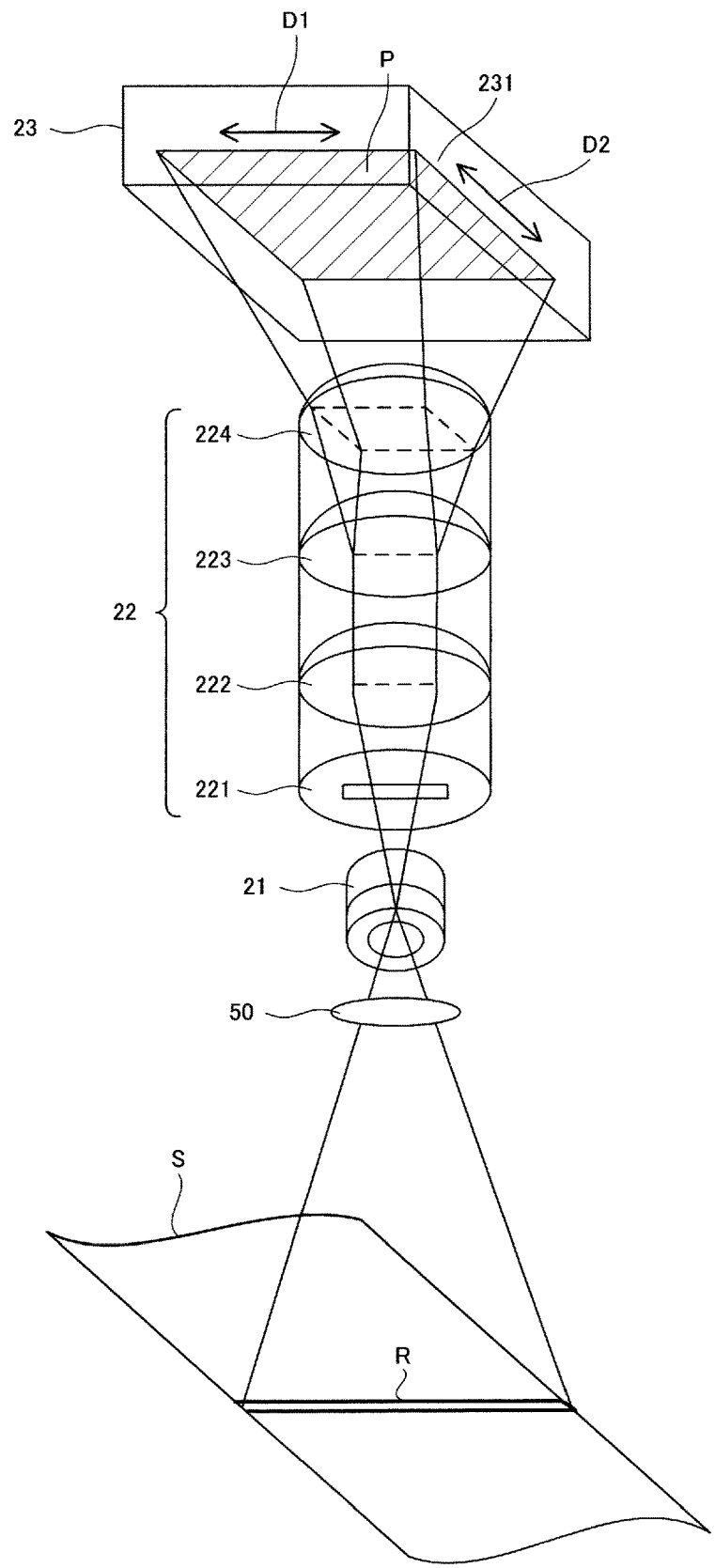
FIG. 3 is a diagram showing a configuration of the reception optical system included in the optical measurement apparatus according to the first embodiment of the present invention.

FIG. 3 is a diagram showing a configuration of the reception optical system included in the optical measurement apparatus according to the first embodiment of the present invention.

As shown in FIG. 3, the imaging spectroscope 22 includes a slit portion 221, a first lens 222, a diffraction grating 223, and a second lens 224. The slit portion 221, the first lens 222, the diffraction grating 223, and the second lens 224 are arranged in this order from the objective lens 21 side.

The imaging unit 23 is constituted by an imaging device 231 that has a two-dimensional light-receiving surface. Such an imaging device 231 is a CCD (Charge Coupled Device) image sensor or a CMOS (Complementary Metal Oxide Semiconductor) image sensor, for example. The imaging unit 23 generates a two-dimensional image P based on the measurement light received from the imaging spectroscope 22. The two-dimensional image P generated by the imaging unit 23 includes wavelength information and position information.

For example, the polarizing plate 50 is located on the light path of measurement light from the target area R to the objective lens 21. The polarizing plate 50 has an absorption axis. For example, the polarizing plate 50 is fixed on the light path, using a fixing member such as a bolt, such that the direction in which the absorption axis extends is adjustable and the position of the polarizing plate 50 relative to the reception optical system 20 is fixed.

The direction in which the absorption axis of the polarizing plate 50 extends in a plane that intersects the light path of measurement light is adjusted by the adjustment unit 51 before in-line measurement of the transmittance spectrum of the measurement subject S is started, for example. Note that the direction may be manually adjusted by a user.

The polarizing plate 50 absorbs light that vibrates in a direction parallel to the absorption axis, of the measurement light from the target area R. Light passing through the polarizing plate 50 is guided to the objective lens 21.

The objective lens 21 converges and guides light passing through the polarizing plate 50, of the measurement light from the target area R, to the imaging spectroscope 22.

The slit portion 221 of the imaging spectroscope 22 includes a slit. The slit portion 221 shapes the beam cross section of the measurement light that has entered the slit portion 221 through the objective lens 21, into a predetermined shape. The length of the slit of the slit portion 221 in the longitudinal direction thereof is set according to the length of the target area R, and the width of the slit in the lateral direction thereof is set according to the resolution of the diffraction grating 223, for example.

The first lens 222 of the imaging spectroscope 22 converts measurement light passing through the slit portion 221 into parallel light, and guides the converted measurement light to the diffraction grating 223. The first lens 222 is a collimating lens, for example.

The diffraction grating 223 of the imaging spectroscope 22 performs wavelength expansion on measurement light in a direction that is orthogonal to the longitudinal direction of the measurement light. More specifically, the diffraction grating 223 performs wavelength expansion on the linear measurement light passing through the slit portion 221, i.e. splits the linear measurement light, in a direction that is orthogonal to the line direction.

The second lens 224 of the imaging spectroscope 22 forms an image of the measurement light subjected to the wavelength expansion performed by the diffraction grating 223, on the light-receiving surface of the imaging device 231 included in the imaging unit 23 as a two-dimensional optical spectrum that reflects wavelength information and position information.

The imaging unit 23 transmits two-dimensional image data that represents the two-dimensional image P formed on the light-receiving surface of the imaging device 231, to the processing device 30, as the result of light reception performed in the reception optical system 20.

In the following description, the direction D1 of the two-dimensional image P shown in FIG. 3 is referred to as a "positional direction", and the direction D2 that is orthogonal to the positional direction is referred to as a "wavelength direction". Points in the positional direction respectively correspond to measurement points X on the target area R. Points in the wavelength direction respectively correspond to the wavelengths of measurement light from the measurement points X corresponding thereto. The light-receiving surface of the imaging device 231 has m channels as the resolution in the wavelength direction and n channels as the resolution in the positional direction. n is 1200, for example.

Processing Device

Figure 4:
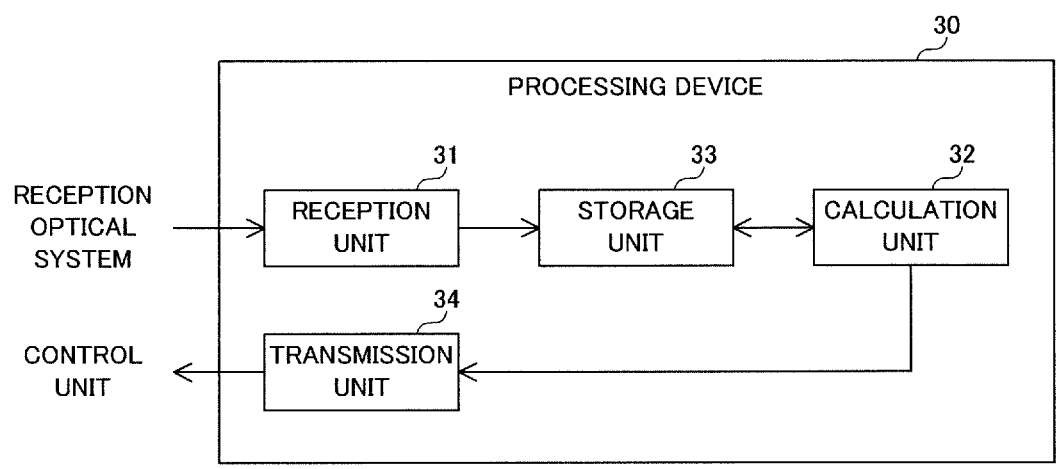
FIG. 4 is a diagram showing a configuration of the processing device included in the optical measurement apparatus according to the first embodiment of the present invention.

FIG. 4 is a diagram showing a configuration of the processing device included in the optical measurement apparatus according to the first embodiment of the present invention.

As shown in FIG. 4, the processing device 30 includes a reception unit 31, a calculation unit 32, a storage unit 33, and a transmission unit 34. The processing device 30 is a personal computer, for example. The reception unit 31, the calculation unit 32, and the transmission unit 34 are, for example, realized by a processor such as CPU (Central Processing Unit) or DSP (Digital Signal Processor). The storage unit 33 is, for example, a non-volatile memory.

The reception unit 31 receives two-dimensional image data from the imaging unit 23 included in the reception optical system 20, and stores the received two-dimensional image data in the storage unit 33.

The calculation unit 32 generates a reception light spectrum $S(\lambda)$ that indicates the relationship between a wavelength $\lambda$ and the intensity of measurement light in the target area R, based on the result of reception of the measurement light performed by the reception optical system 20. Thereafter, the calculation unit 32 calculates, for each wavelength, the transmittance of the measurement subject S moved across the target area R, based on the reception light spectrum $S(\lambda)$ thus generated.

More specifically, the calculation unit 32 generates the reception light spectrum $S(\lambda)$ based on the two-dimensional image data stored in the storage unit 33, and calculates the transmittance of the measurement subject S for each wavelength A, based on the reception light spectrum $S(\lambda)$ thus generated.

For example, the calculation unit 32 calculates a transmittance spectrum $ST(\lambda)$, which is the relationship between the wavelength $\lambda$ and the transmittance of the measurement subject S, based on a criterion spectrum $Str(\lambda)$ that is a reception light spectrum $S(\lambda)$ that is based on the measurement light travelling from the target area R when the measurement subject S is not present, and a measurement spectrum $Stm(\lambda)$ that is a reception light spectrum $S(\lambda)$ that is based on the measurement light travelling from the target area R when the measurement subject S is present.

For example, the calculation unit 32 calculates the film thickness of the measurement subject S based on the transmittance spectrum $ST(\lambda)$ thus calculated. More specifically, the calculation unit 32 generates a power spectrum by performing arithmetic processing such as Fourier transform on the calculated transmittance spectrum $ST(\lambda)$. Thereafter, the calculation unit 32 determines the optical film thickness corresponding to the peak wavelength of the generated power spectrum as the film thickness of the measurement subject S.

For example, the calculation unit 32 generates a plurality of criterion spectra $Str(\lambda)$ and a plurality of measurement spectra $Stm(\lambda)$ for the measurement points X in the target area R respectively, and calculates a plurality of transmittance spectra $ST(\lambda)$ for the measurement points X based on the generated criterion spectra $Str(\lambda)$ and measurement spectra $Stm(\lambda)$ respectively. Thereafter, the calculation unit 32 calculates the film thickness distribution that indicates the film thickness of the measurement subject S at the measurement points X, based on the transmittance spectra $ST(\lambda)$ thus calculated.

Note that the calculation unit 32 may be configured to calculate the hue of the measurement subject S based on the transmittance spectrum $ST(\lambda)$ thus calculated.

Processing for Adjusting Direction of Absorption Axis of Polarizing Plate

The adjustment unit 51 can adjust the direction in which the absorption axis of the polarizing plate 50 extends in a plane that intersects the light path of measurement light. More specifically, the adjustment unit 51 can adjust the direction in which the absorption axis of the polarizing plate 50 extends in a plane that is orthogonal to the light path of measurement light. The adjustment unit 51 is, for example, an electric actuator, a hydraulic actuator, a pneumatic actuator, a chemical actuator, a magnetic fluid actuator, or an electrorheological fluid actuator. For example, the adjustment unit 51 adjusts the direction in which the absorption axis of the polarizing plate 50 extends, so that the angle formed by the absorption axis of the polarizing plate 50 and the optical axis of the measurement subject S is within the range of −10 degrees to 10 degrees or the range of 80 degrees to 100 degrees.

For example, the adjustment unit 51 adjusts the direction in which the absorption axis of the polarizing plate 50 extends, so that a single peak that is not buried in the background appears in the power spectrum generated by performing arithmetic processing such as Fourier transform on the transmittance spectrum of the measurement subject S.

For example, the adjustment unit 51 adjusts the direction in which the absorption axis of the polarizing plate 50 extends, according to a control signal from the processing device 30 before starting in-line measurement of the transmittance spectrum of the measurement subject S.

More specifically, the calculation unit 32 outputs, to the transmission unit 34, a control signal for adjusting an angle $\theta a$ formed by a predetermined reference direction in a plane that is orthogonal to the light path of measurement light and the direction in which the absorption axis of the polarizing plate 50 extends in the plane, to be an initial angle $\theta as$, before starting in-line measurement of the transmittance spectrum of the measurement subject S.

Upon receiving the control signal from the calculation unit 32, the transmission unit 34 transmits the received control signal to the adjustment unit 51.

For example, upon receiving the control signal from the transmission unit 34, the adjustment unit 51 adjusts the angle $\theta a$ to be the angle $\theta as$ by rotating the polarizing plate 50 according to the received control signal.

Upon the angle $\theta a$ being adjusted by the adjustment unit 51, the calculation unit 32 calculates the transmittance spectrum $ST(\lambda)$ of the measurement subject S at a certain measurement position M. For example, the calculation unit 32 calculates the transmittance spectrum $ST(\lambda)$ in an end portion of the target area R in the longitudinal direction thereof, at the measurement position M. Next, the calculation unit 32 generates a power spectrum by performing arithmetic processing such as Fourier transform on the calculated transmittance spectrum $ST(\lambda)$. Thereafter, the calculation unit 32 calculates a difference D between the intensity of the largest peak and the intensity of the second largest peak of the generated power spectrum. The calculation unit 32 stores the calculated difference D in the storage unit 33.

Also, upon storing the difference D in the storage unit 33, the calculation unit 32 transmits a control signal for changing the angle $\theta a$ by, for example, rotating it by three degrees clockwise, to the adjustment unit 51 via the transmission unit 34.

Upon receiving the control signal from the calculation unit 32 via the transmission unit 34, the adjustment unit 51 adjusts the angle $\theta a$ again according to the received control signal.

Upon the angle $\theta a$ being adjusted by the adjustment unit 51, the calculation unit 32 calculates the transmittance spectrum $ST(\lambda)$ of the measurement subject S at the measurement position M and generates a power spectrum again, and calculates the difference D of the power spectrum.

As described above, the calculation unit 32 repeatedly changes the angle $\theta a$ and calculates the difference D of the power spectrum a predetermined number of times, e.g. sixty times, and calculates the difference D for each angle $\theta a$.

Thereafter, the calculation unit 32 detects an angle θmax that is the angle θa when the difference D is at the maximum value.

Upon detecting the angle θmax, the calculation unit 32 transmits a control signal for setting the angle θa to the angle θmax, to the adjustment unit 51 via the transmission unit 34. Note that the calculation unit 32 may be configured to detect one or more angles θth, which are an angle θa when the difference D is no less than a predetermined threshold value, and transmit a control signal for setting the angle θa to any one of the angles θth to the adjustment unit 51 via the transmission unit 34. Alternatively, the calculation unit 32 may be configured to detect the angle θa when the most acute single peak appears as the angle θmax, based on an indicator that indicates the acuteness of the peak appearing in the power spectrum, and transmit a control signal for setting the angle θ$a$ to the detected angle θmax, to the adjustment unit 51 via the transmission unit 34.

Upon receiving the control signal from the calculation unit 32 via the transmission unit 34, the adjustment unit 51 rotates the polarizing plate 50 so that the angle θa becomes the angle θmax, based on the received control signal.

In a state where the angle θa is set to be the angle θmax, the optical measurement apparatus 101 starts in-line measurement of the transmittance spectrum $ST(\lambda)$ of the measurement subject S.

For example, the optical measurement apparatus 101 is used to measure the film thickness of the measurement subject S that has birefringence. Specifically, the measurement subject S is a stretched film of PET (Polyethylene terephthalate), for example. A stretched film of PET has optical axes such as a slow axis Nx and a fast axis Ny, depending on the stretching direction and stretching magnification thereof. The slow axis Nx and the fast axis Ny are orthogonal to each other, for example. The slow axis Nx and the fast axis Ny of the measurement subject S are examples of the optical axes of the measurement subject S.

Also, for example, the optical measurement apparatus 101 is used to measure the film thickness of the measurement subject S that has polarization properties. Specifically, the measurement subject S is an elongated polarizing film, for example. A polarizing film is stretched in the manufacturing process, and has an absorption axis in a direction corresponding to the stretching direction. The absorption axis of the measurement subject S is an example of the optical axes of the measurement subject S.

In the case of a conventional optical measurement method, when measuring the film thickness of the measurement subject S that has birefringence or polarization properties, it may be impossible to accurately measure the film thickness of the measurement subject S. Specifically, for example, in the case of a conventional optical measurement method, a beat component is included in the calculated transmittance spectrum due to the influence of the birefringence of the measurement subject S. Therefore, in the power spectrum obtained by performing Fourier transform on the transmittance spectrum, a plurality of peaks may occur at different positions as peaks corresponding to the film thickness of the measurement subject S. In such a case, it is difficult to accurately measure the film thickness of the measurement subject S. Also, for example, in the case of a conventional optical measurement method, the peak corresponding to the film thickness of the measurement subject S in the power spectrum may be buried in the background due to the influence of the birefringence of the measurement subject S. In such a case, it is difficult to accurately measure the film thickness of the measurement subject S. Also, for example, in the case of a conventional optical measurement method, the peak corresponding to the film thickness of the measurement subject S in the power spectrum may be buried in the background due to the influence of the polarization properties of the measurement subject S. In such a case, it is difficult to accurately measure the film thickness of the measurement subject S.

Also, the techniques disclosed in Patent Document 3 and Patent Document 4 employ a configuration in which, in order to measure the retardation of the measurement subject, the polarizing plate is disposed so that light with which the measurement subject is irradiated and light output from the measurement subject both pass through the polarizing plate. Therefore, light with which the measurement subject is irradiated and light output from the measurement subject are both attenuated by the polarizing plate. Therefore, it may be impossible to accurately measure the film thickness within a limited measurement time.

Measurement Example 1

Figure 5:
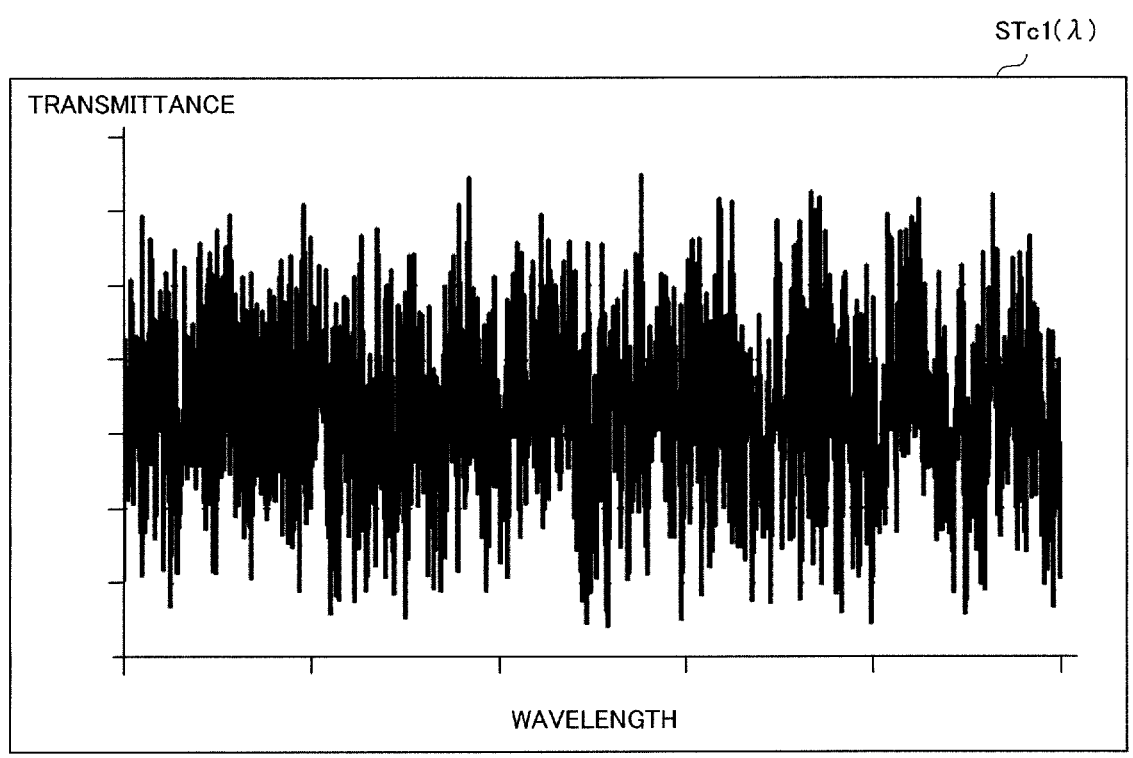
FIG. 5 is a diagram showing transmittance spectrum generated by an optical measurement apparatus according to a first comparative example of the first embodiment of the present invention.

FIG. 5 is a diagram showing transmittance spectrum generated by an optical measurement apparatus according to a first comparative example of the first embodiment of the present invention. In FIG. 5, the vertical axis represents transmittance and the horizontal axis represents wavelength. FIG. 5 shows a transmittance spectrum $Stc1(\lambda)$ at a certain measurement point on the measurement subject S that has birefringence, generated by an optical measurement apparatus 101 that is not provided with the polarizing plate 50.

Figure 6:
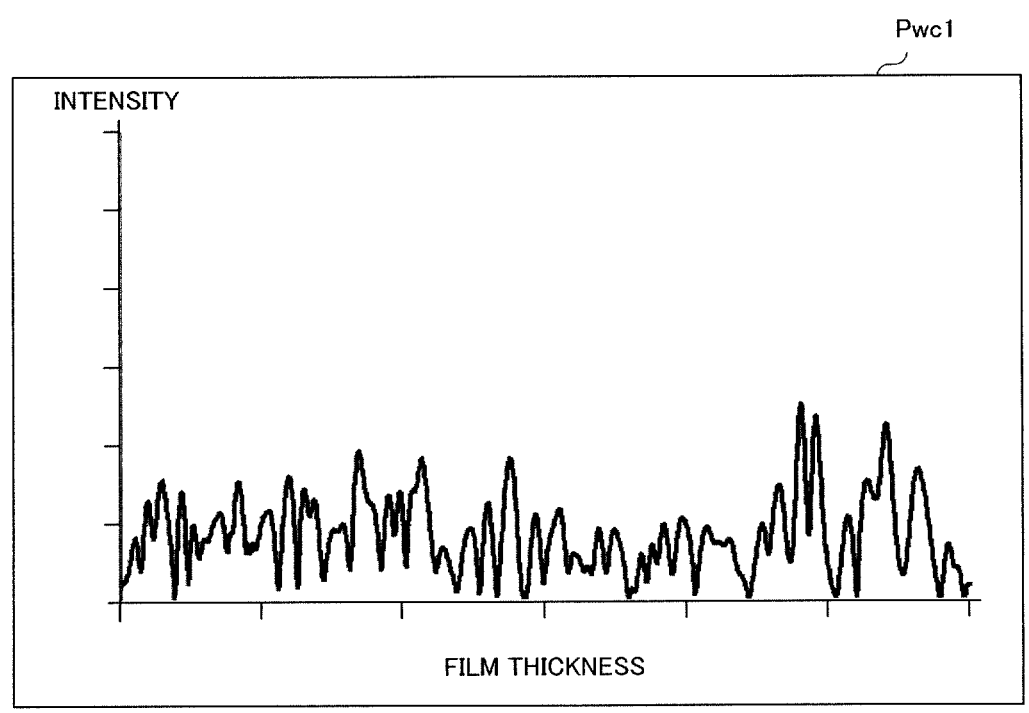
FIG. 6 is a diagram showing a power spectrum of the transmittance spectrum generated by the optical measurement apparatus according to the first comparative example of the first embodiment of the present invention.

FIG. 6 is a diagram showing a power spectrum of the transmittance spectrum generated by the optical measurement apparatus according to the first comparative example of the first embodiment of the present invention. In FIG. 6, the vertical axis represents intensity and the horizontal axis represents film thickness. FIG. 6 shows a power spectrum Pwc1 obtained by performing Fourier transform on the transmittance spectrum $STc1(\lambda)$ shown in FIG. 5.

As shown in FIG. 6, in the power spectrum Pwc1 generated by the optical measurement apparatus 101 according to the first comparative example, the peak that should appear in correspondence with the film thickness of the measurement subject S is buried in the background. Therefore, it is impossible to uniquely detect the largest peak. Thus, it is difficult to accurately measure the film thickness of the measurement subject S.

Figure 7:
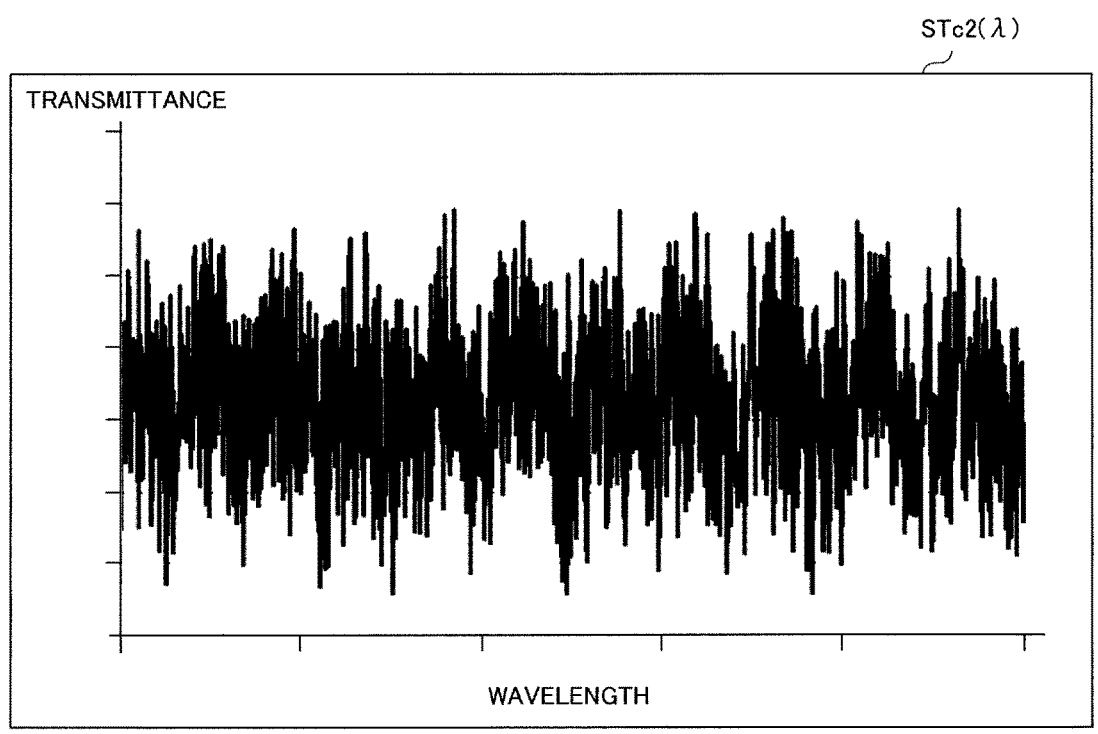
FIG. 7 is a diagram showing a transmittance spectrum generated by an optical measurement apparatus according to a second comparative example of the first embodiment of the present invention.

FIG. 7 is a diagram showing a transmittance spectrum generated by an optical measurement apparatus according to a second comparative example of the first embodiment of the present invention. In FIG. 7, the vertical axis represents transmittance and the horizontal axis represents wavelength. FIG. 7 shows a transmittance spectrum $STc2(\lambda)$ at a certain measurement point on the measurement subject S that has birefringence, generated by an optical measurement apparatus 101 in which the angle formed between the direction in which the absorption axis of the polarizing plate 50 extends and the direction in which the slow axis Nx of the measurement subject S extends is 45 degrees.

Figure 8:
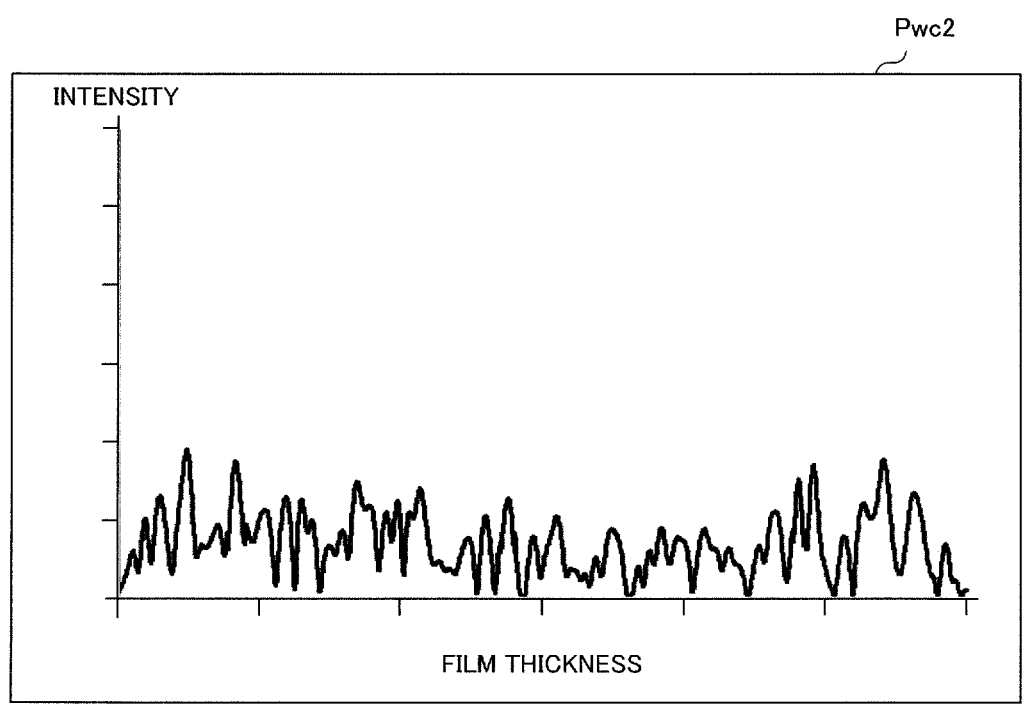
FIG. 8 is a diagram showing a power spectrum of the transmittance spectrum generated by the optical measurement apparatus according to the second comparative example of the first embodiment of the present invention.

FIG. 8 is a diagram showing a power spectrum of the transmittance spectrum generated by the optical measurement apparatus according to the second comparative example of the first embodiment of the present invention. In FIG. 8, the vertical axis represents intensity and the horizontal axis represents film thickness. FIG. 8 shows a power spectrum Pwc2 obtained by performing Fourier transform on the transmittance spectrum $STc2(\lambda)$ shown in FIG. 7.

As shown in FIG. 8, in the power spectrum Pwc2 generated by the optical measurement apparatus 101 according to the second comparative example, as in the power spectrum Pwc1, the peak that should appear in correspondence with the film thickness of the measurement subject S is buried in the background. Therefore, it may be impossible to uniquely detect the largest peak. In such a case, it is difficult to accurately measure the film thickness of the measurement subject S.

Figure 9:
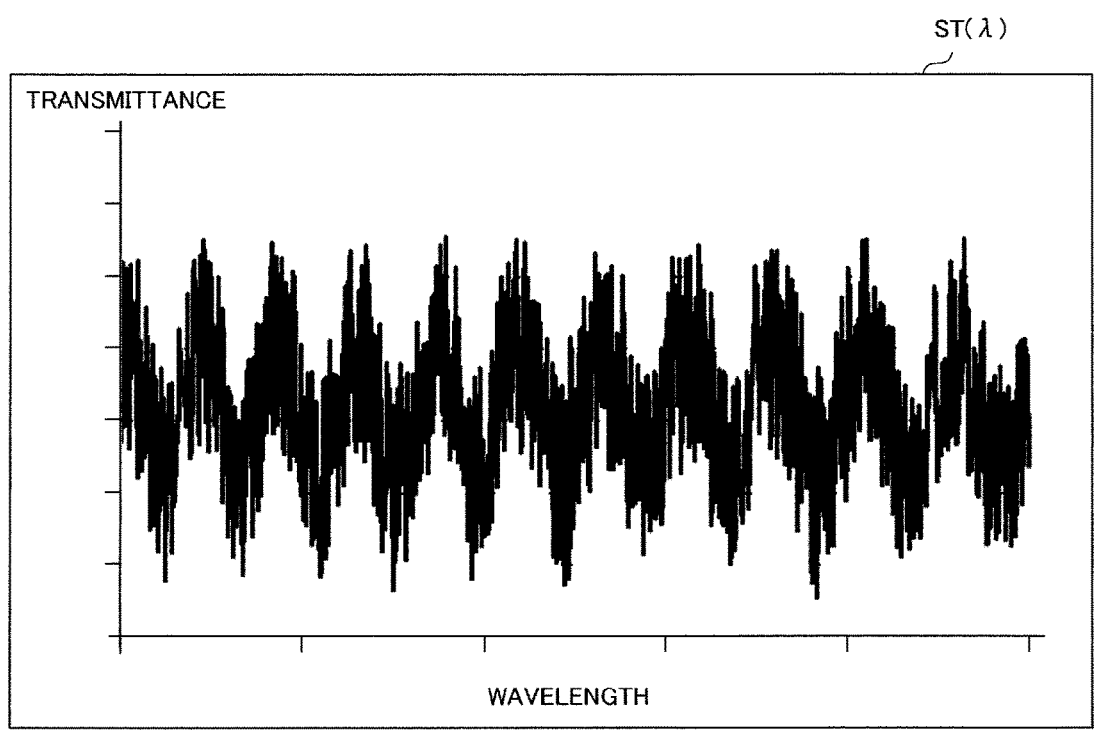
FIG. 9 is a diagram showing a transmittance spectrum generated by the optical measurement apparatus according to the first embodiment of the present invention.

FIG. 9 is a diagram showing a transmittance spectrum generated by the optical measurement apparatus according to the first embodiment of the present invention. In FIG. 9, the vertical axis represents transmittance and the horizontal axis represents wavelength. FIG. 9 shows a transmittance spectrum ST(λ) at a certain measurement point on the measurement subject S that has birefringence, generated by an optical measurement apparatus 101 in which the absorption axis of the polarizing plate 50 is adjusted so as to be parallel with the direction in which the slow axis Nx of the measurement subject S extends.

Figure 10:
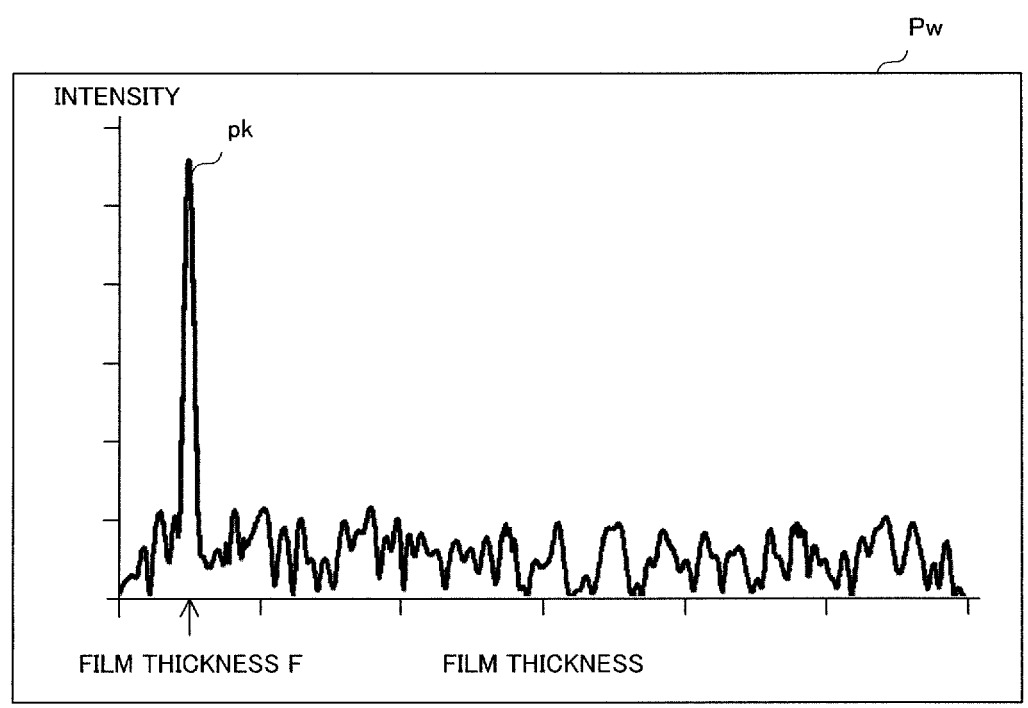
FIG. 10 is a diagram showing a power spectrum of a transmittance spectrum generated by the optical measurement apparatus according to the first embodiment of the present invention.

FIG. 10 is a diagram showing a power spectrum of a transmittance spectrum generated by the optical measurement apparatus according to the first embodiment of the present invention. In FIG. 10, the vertical axis represents intensity and the horizontal axis represents film thickness. FIG. 10 shows a power spectrum Pw obtained by performing Fourier transform on the transmittance spectrum ST(λ) shown in FIG. 9.

As shown in FIG. 10, in the case of the power spectrum Pw generated by the optical measurement apparatus 101 according to the first embodiment of the present invention, it is possible to uniquely detect the largest peak pk, and accordingly, it is possible to accurately measure a film thickness F of the measurement subject S corresponding to the peak pk.

Measurement Example 2

Figure 11:
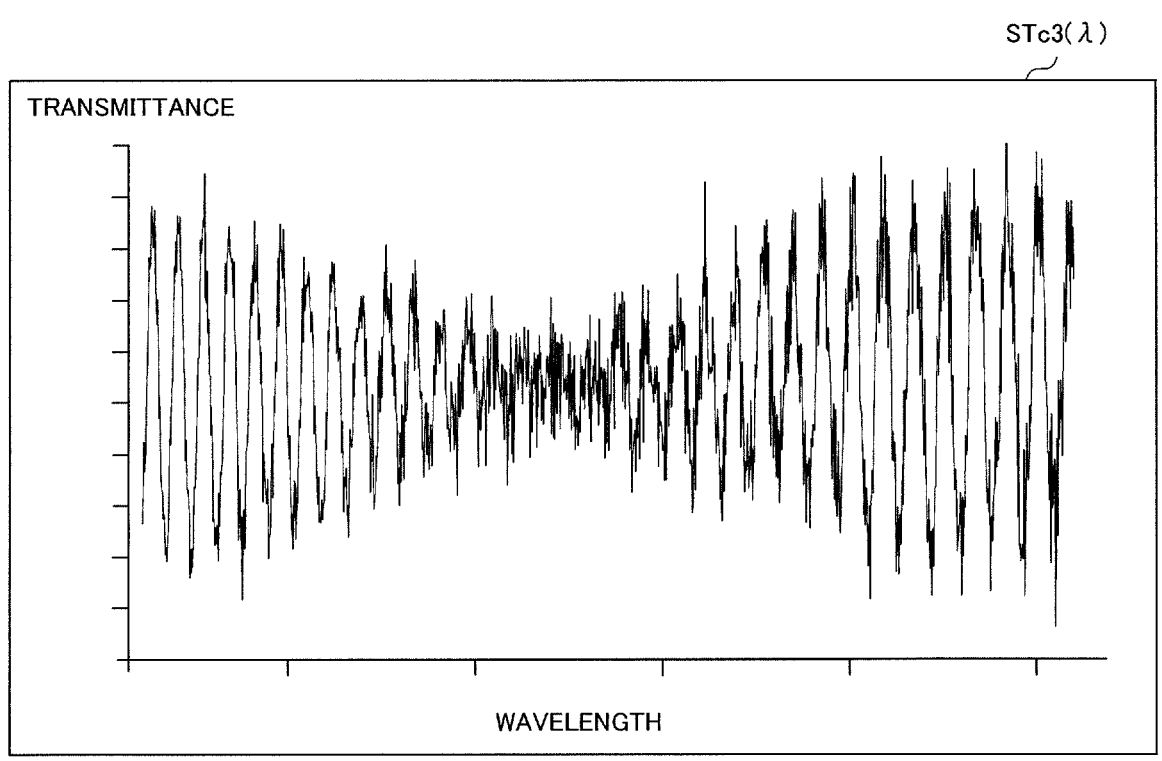
FIG. 11 is a diagram showing a transmittance spectrum generated by an optical measurement apparatus according to a third comparative example of the first embodiment of the present invention.

FIG. 11 is a diagram showing a transmittance spectrum generated by an optical measurement apparatus according to a third comparative example of the first embodiment of the present invention. In FIG. 11, the vertical axis represents transmittance and the horizontal axis represents wavelength. FIG. 11 shows a transmittance spectrum STc3(λ) at a certain measurement point on the measurement subject S that has birefringence, generated by an optical measurement apparatus 101 in which the angle formed between the direction in which the absorption axis of the polarizing plate 50 extends and the direction in which the slow axis Nx of the measurement subject S extends is 45 degrees.

Figure 12:
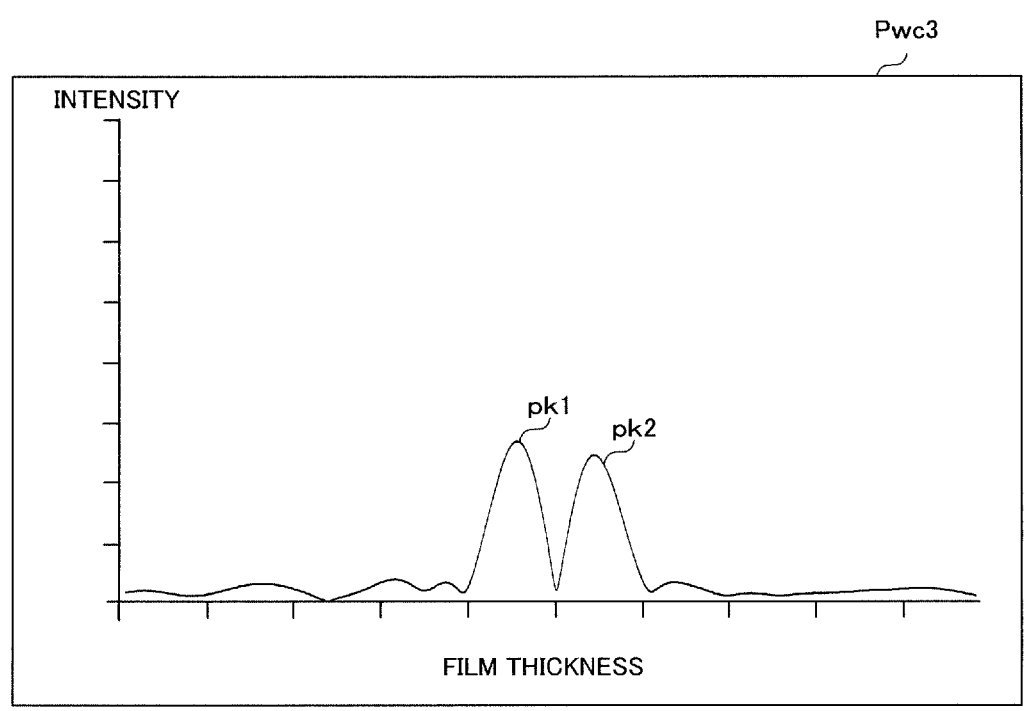
FIG. 12 is a diagram showing a power spectrum of a transmittance spectrum generated by an optical measurement apparatus according to a third comparative example of the first embodiment of the present invention.

FIG. 12 is a diagram showing a power spectrum of a transmittance spectrum generated by an optical measurement apparatus according to a third comparative example of the first embodiment of the present invention. In FIG. 12, the vertical axis represents intensity and the horizontal axis represents film thickness. FIG. 12 shows a power spectrum Pwc3 obtained by performing Fourier transform on the transmittance spectrum STc3(λ) shown in FIG. 11.

As shown in FIG. 12, peaks pk1 and pk2 occur in the power spectrum Pwc3 generated by the optical measurement apparatus 101 according to the third comparative example, and it may be impossible to uniquely detect the largest peak. In such a case, it is difficult to accurately measure the film thickness of the measurement subject S.

Figure 13:
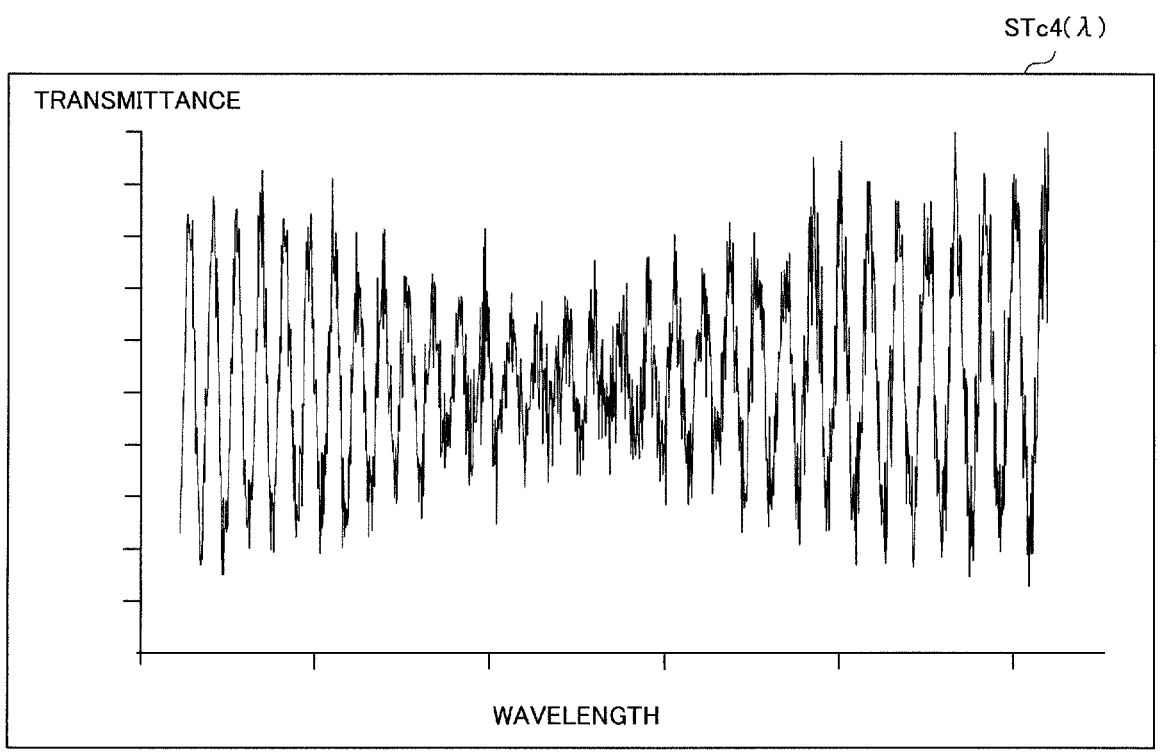
FIG. 13 is a diagram showing a transmittance spectrum generated by an optical measurement apparatus according to a fourth comparative example of the first embodiment of the present invention.

FIG. 13 is a diagram showing a transmittance spectrum generated by an optical measurement apparatus according to a fourth comparative example of the first embodiment of the present invention. In FIG. 13, the vertical axis represents transmittance and the horizontal axis represents wavelength. FIG. 13 shows a transmittance spectrum STc4(λ) at a certain measurement point on the measurement subject S that has birefringence, generated by an optical measurement apparatus 101 in which the angle formed between the direction in which the absorption axis of the polarizing plate 50 extends and the direction in which the slow axis Nx of the measurement subject S extends is 75 degrees.

Figure 14:
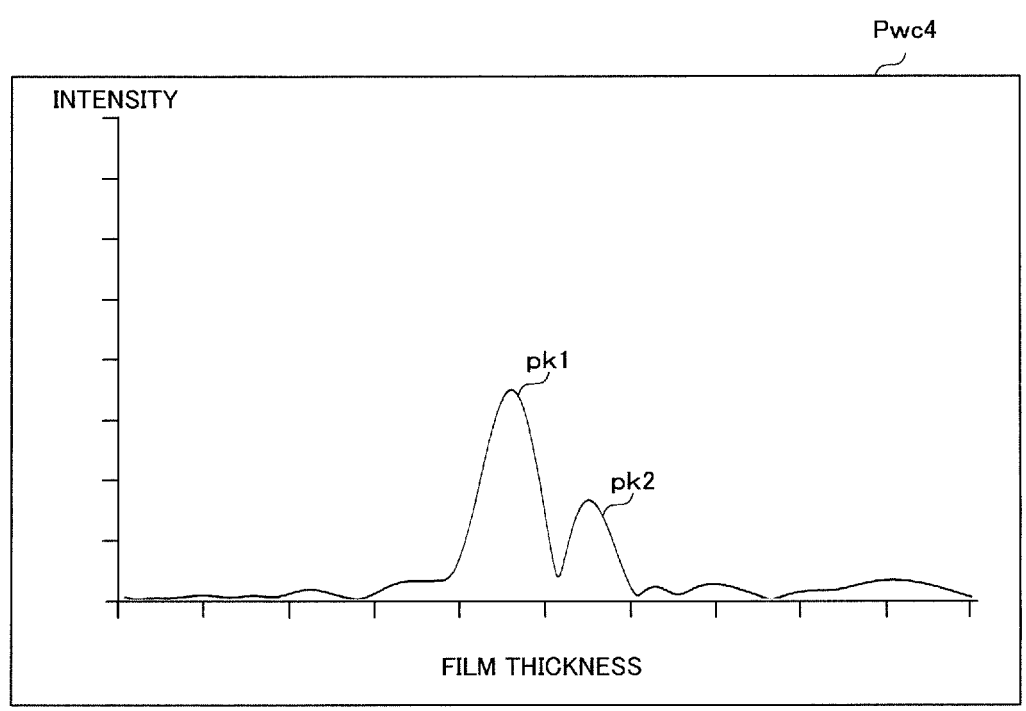
FIG. 14 is a diagram showing a power spectrum of a transmittance spectrum generated by the optical measurement apparatus according to the fourth comparative example of the first embodiment of the present invention.

FIG. 14 is a diagram showing a power spectrum of a transmittance spectrum generated by the optical measurement apparatus according to the fourth comparative example of the first embodiment of the present invention. In FIG. 14, the vertical axis represents intensity and the horizontal axis represents film thickness. FIG. 14 shows a power spectrum Pwc4 obtained by performing Fourier transform on the transmittance spectrum STc4(λ) shown in FIG. 13.

As shown in FIG. 14, peaks pk1 and pk2 occur in the power spectrum Pwc4 generated by the optical measurement apparatus 101 according to the fourth comparative example, as in the power spectrum Pwc3. The peak pk2 in the power spectrum Pwc4 is smaller than the peak pk2 in the power spectrum Pwc3. However, in the case of the power spectrum Pwc4, it may be impossible to uniquely detect the largest peak, depending on measurement conditions or the like. In such a case, it is difficult to accurately measure the film thickness of the measurement subject S.

Figure 15:
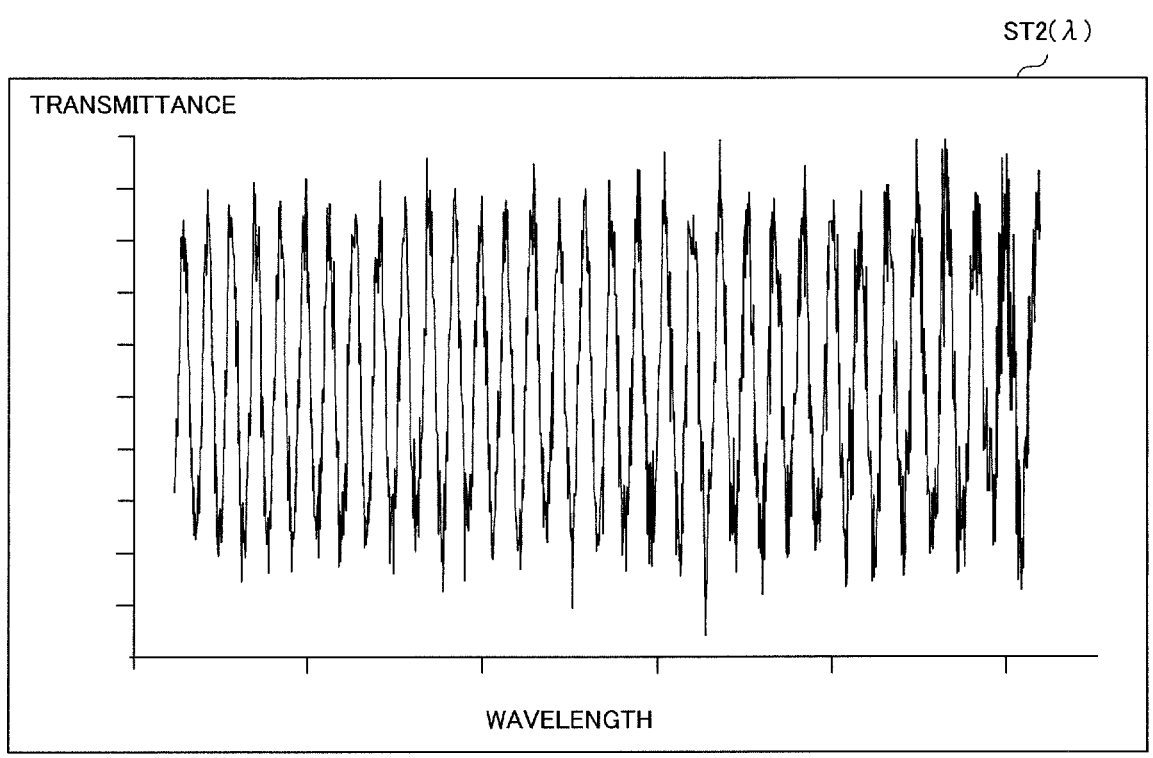
FIG. 15 is a diagram showing a transmittance spectrum generated by the optical measurement apparatus according to the first embodiment of the present invention.

FIG. 15 is a diagram showing a transmittance spectrum generated by the optical measurement apparatus according to the first embodiment of the present invention. In FIG. 15, the vertical axis represents transmittance and the horizontal axis represents wavelength. FIG. 15 shows a transmittance spectrum ST2(λ) at a certain measurement point on the measurement subject S that has birefringence, generated by an optical measurement apparatus 101 in which the angle formed between the direction in which the absorption axis of the polarizing plate 50 extends and the direction in which the slow axis Nx of the measurement subject S extends is 90 degrees.

Figure 16:
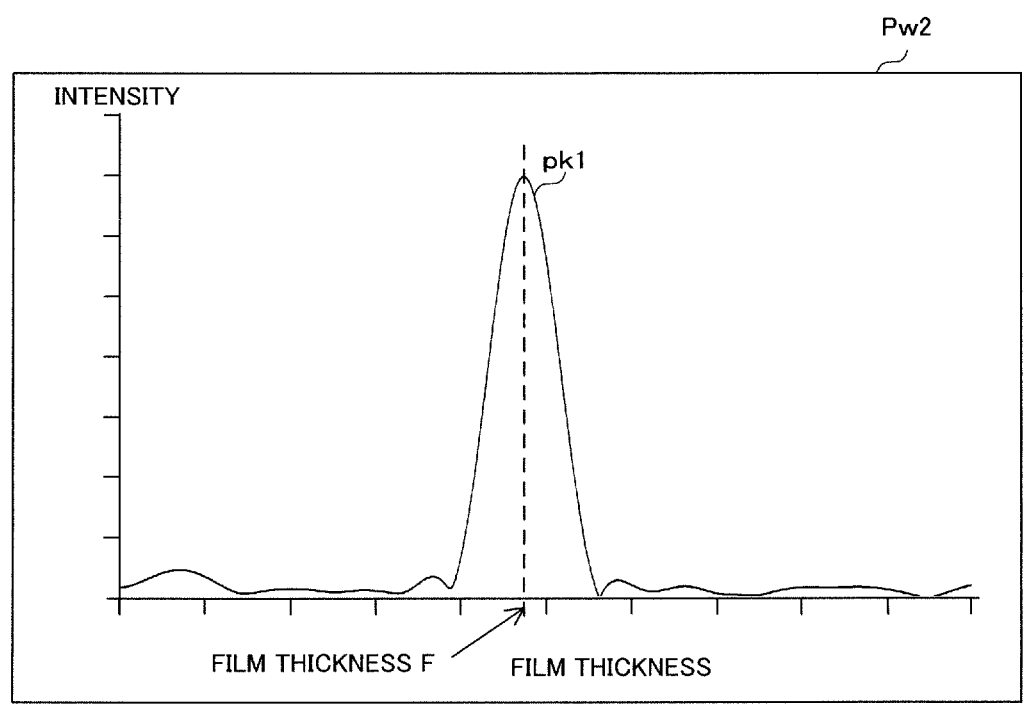
FIG. 16 is a diagram showing a power spectrum of a transmittance spectrum generated by the optical measurement apparatus according to the first embodiment of the present invention.

FIG. 16 is a diagram showing a power spectrum of a transmittance spectrum generated by the optical measurement apparatus according to the first embodiment of the present invention. In FIG. 16, the vertical axis represents intensity and the horizontal axis represents film thickness. FIG. 16 shows a power spectrum Pw2 obtained by performing Fourier transform on the transmittance spectrum ST2(λ) shown in FIG. 15.

As shown in FIG. 16, in the case of the power spectrum Pw2 generated by the optical measurement apparatus 101 according to the first embodiment of the present invention, it is possible to uniquely detect the largest peak pk1, and accordingly, it is possible to accurately measure the film thickness F of the measurement subject S corresponding to the peak pk1.

Figure 17:
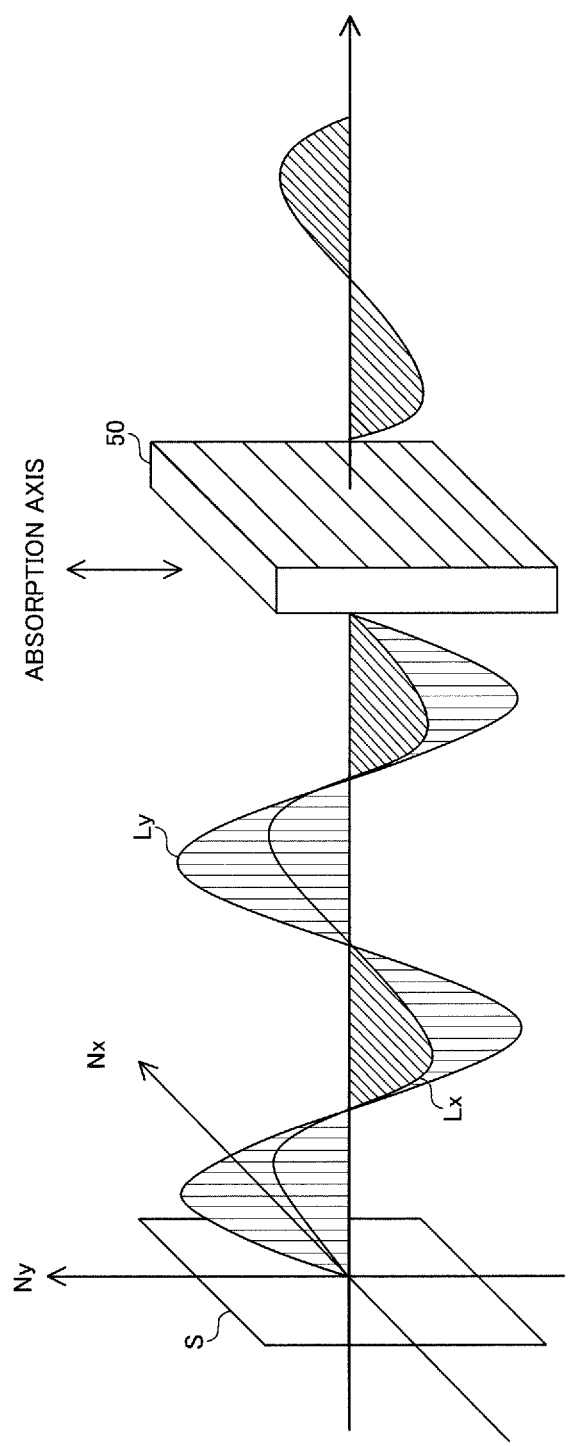
FIG. 17 is a diagram showing a relationship between the direction in which the absorption axis of the polarizing plate in the optical measurement apparatus according to the first embodiment of the present invention and the slow axis of the measurement subject.

FIG. 17 is a diagram showing a relationship between the direction in which the absorption axis of the polarizing plate in the optical measurement apparatus according to the first embodiment of the present invention and the slow axis of the measurement subject.

As shown in FIG. 17, the irradiation optical system 10 irradiates the measurement subject S with irradiation light that is natural light. The transmission light passing through the measurement subject S includes a light ray Lx that vibrates in a direction that is parallel to the slow axis Nx of the measurement subject S and a light ray Ly that vibrates in the direction that is parallel to the fast axis Ny of the measurement subject S.

For example, the peak pk1 of the power spectra Pwc3 and Pwc4 is a peak that corresponds to the light ray Lx, and the peak pk2 of the power spectra Pwc3 and Pwc4 is a peak that corresponds to the light ray Ly.

The optical measurement apparatus 101 according to the third comparative example receives the light ray Lx attenuated by the polarizing plate 50 and the light ray Ly attenuated by the polarizing plate 50. Here, the angle formed by the direction in which the absorption axis of the polarizing plate 50 in the optical measurement apparatus 101 according to the third comparative example extends and the direction in which the slow axis Nx of the measurement subject S extends is 45 degrees, and therefore the amount of attenuation of the light ray Lx caused by the polarizing plate 50 and the amount of attenuation of the light ray Ly caused by the polarizing plate 50 are substantially the same. Therefore, in the power spectrum Pwc3 generated by the optical measurement apparatus 101 according to the third comparative example, the peak pk1 that corresponds to the light ray Lx and the peak pk2 that corresponds to the light ray Ly and has substantially the same size as the peak pk1 occur.

The optical measurement apparatus 101 according to the fourth comparative example receives the light ray Lx attenuated by the polarizing plate 50 and the light ray Ly attenuated by the polarizing plate 50. Here, the angle formed by the direction in which the absorption axis of the polarizing plate 50 in the optical measurement apparatus 101 according to the fourth comparative example extends and the direction in which the slow axis Nx of the measurement subject S extends is 75 degrees, and therefore the amount of attenuation of the light ray Ly caused by the polarizing plate 50 is larger than the amount of attenuation of the light ray Lx caused by the polarizing plate 50. Therefore, in the power spectrum Pwc4 generated by the optical measurement apparatus 101 according to the fourth comparative example, the peak pk1 that corresponds to the light ray Lx and the peak pk2 that corresponds to the light ray Ly and is smaller than the peak pk1 occur.

In contrast, the angle formed by the direction in which the absorption axis of the polarizing plate 50 in the optical measurement apparatus 101 according to the first embodiment extends and the direction in which the slow axis Nx of the measurement subject S extends is 90 degrees, and therefore, as shown in FIG. 17, the light ray Lx passes through the polarizing plate 50 without being attenuated by the polarizing plate 50, whereas the light ray Ly is absorbed by the polarizing plate 50. Therefore, in the power spectrum Pw2 generated by the optical measurement apparatus 101 according to the first embodiment, peak pk1 that corresponds to the light ray Lx occurs, but the peak that corresponds to the light ray Ly does not occur. Therefore, it is possible to uniquely detect the largest peak pk1, and it is possible to accurately measure the film thickness F of the measurement subject S corresponding to the peak pk1.

Modification 1

The calculation unit 32 calculates the film thickness of the measurement subject S based on the result of receiving measurement light in each of the cases where directions in which the absorption axis of the polarizing plate extends in a plane that is orthogonal to the light path of the irradiation light are different.

For example, the calculation unit 32 determines the average of a film thickness Fmax1 and a film thickness Fmax2 as the film thickness of the measurement subject S, where the film thickness Fmax1 is calculated based on the result of reception by the reception optical system 20 of the measurement light travelling from the measurement position M in a state where the angle θa is set to the angle θmax, and the film thickness Fmax2 is calculated based on the result of reception by the reception optical system 20 of the measurement light travelling from the measurement position M in a state where the angle θa is set to an angle (θmax+) 90°.

For example, a direction Da in which the absorption axis of the polarizing plate 50 extends in a state where the angle θa is set to the angle θmax is a direction that is parallel to the slow axis Nx of the measurement object S, and a direction Db in which the absorption axis of the polarizing plate 50 extends in a state where the angle θa is set to the angle (θmax+) 90° is a direction that is parallel to the fast axis Ny of the measurement object S.

More specifically, the optical measurement apparatus 101 includes an irradiation optical system 10a and an irradiation optical system 10b that are lined up in the direction in which the measurement subject S is conveyed, and a reception optical system 20a and a reception optical system 20b that are lined up in the direction in which the measurement subject S is conveyed.

The irradiation optical system 10a and the irradiation optical system 10b irradiate the measurement position M on the measurement subject S with irradiation light.

The reception optical system 20a receives the measurement light travelling from the measurement position M as a result of the measurement position M being irradiated by the irradiation optical system 10a with irradiation light. The reception optical system 20b receives the measurement light travelling from the measurement position M as a result of the measurement position M being irradiated by the irradiation optical system 10b with irradiation light.

The direction Da in which the absorption axis of the polarizing plate 50 in the reception optical system 20a extends and the direction Db in which the absorption axis of the polarizing plate 50 in the reception optical system 20b extends are orthogonal to each other. More specifically, the angle θa of the absorption axis of the polarizing plate 50 in the reception optical system 20a is set to the angle θmax and the angle θa of the absorption axis of the polarizing plate 50 in the reception optical system 20b is set to the angle (θmax+90°).

The calculation unit 32 determines the average of the film thickness Fmax1 and the film thickness Fmax2 as the film thickness of the measurement subject S, where the film thickness Fmax1 is calculated based on the result of reception by the reception optical system 20a of the measurement light travelling from the measurement position M, and the film thickness Fmax2 is calculated based on the result of reception by the reception optical system 20b of the measurement light travelling from the measurement position M.

Modification 2

Although the polarizing plate 50 in the optical measurement apparatus 101 according to the first embodiment of the present invention is fixedly provided only in the reception optical system 20, the present invention is not limited to such a configuration. The polarizing plate 50 may be fixedly provided only in the irradiation optical system 10.

Figure 18:
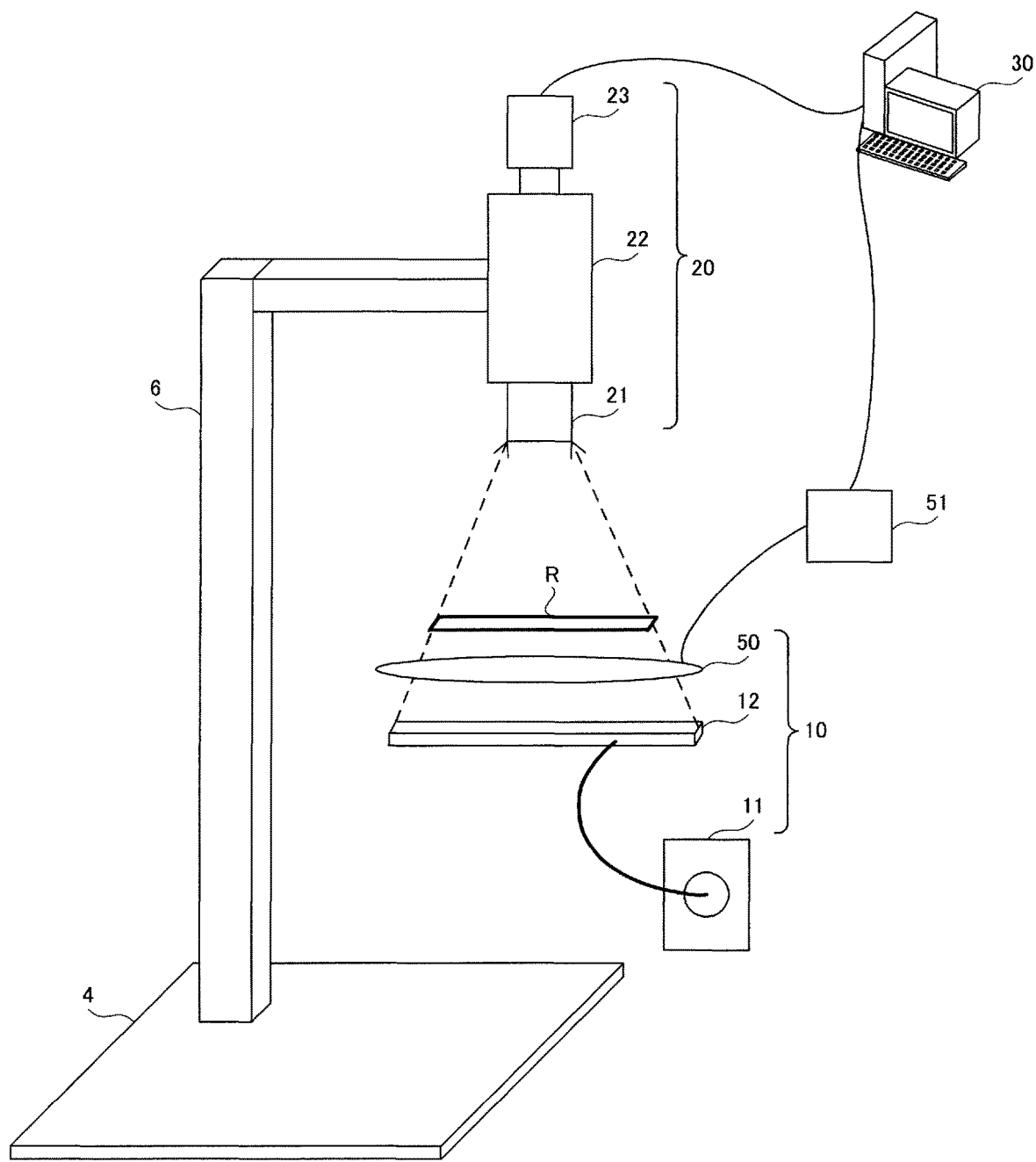
FIG. 18 is a diagram showing an example of the configuration of the optical measurement apparatus according to Modification 2 of the first embodiment of the present invention.

FIG. 18 is a diagram showing an example of the configuration of the optical measurement apparatus according to Modification 2 of the first embodiment of the present invention.

As shown in FIG. 18, in the optical measurement apparatus 101, the reception optical system 20 does not include the polarizing plate 50, whereas the irradiation optical system 10 includes the polarizing plate 50.

More specifically, for example, the polarizing plate 50 is provided on the light path of irradiation light from the line light guide 12 to the target area R. For example, the polarizing plate 50 is fixed on the light path, using a fixing member such as a bolt, such that the direction in which the absorption axis extends is adjustable and the position of the polarizing plate 50 relative to the irradiation optical system 10 is fixed.

The adjustment unit 51 can adjust the direction in which the absorption axis of the polarizing plate 50 extends on a plane that is orthogonal to the light path of irradiation light.

With the optical measurement apparatus 101 according to Modification 2, as with the optical measurement apparatus 101 according to the first embodiment of the present invention, it is possible to uniquely detect the largest peak pk in the generated power spectrum Pw, and it is possible to accurately measure the film thickness F of the measurement subject S corresponding to the peak pk.

Operation Flow

The optical measurement apparatus according to the embodiment of the present invention is provided with a computer that includes a memory, and a calculation unit such as a CPU of the computer reads out a program that includes some or all of the steps of the following flowchart and sequence from the memory, and executes the program. The program for this apparatus can be installed from the outside. The program for this apparatus is distributed in a state of being stored in a recording medium.

Figure 19:
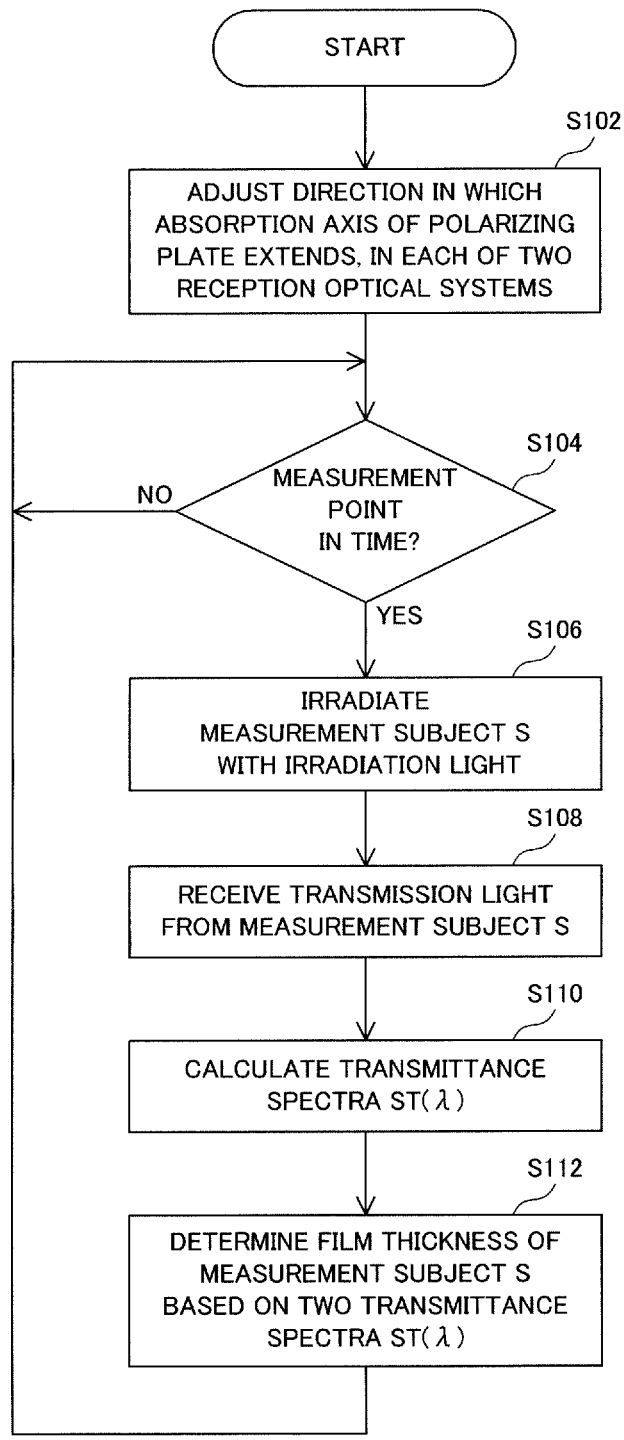
FIG. 19 is a flowchart defining an example of an operation procedure performed when the film thickness of the measurement subject is calculated by the optical measurement apparatus according to Modification 1 of the first embodiment of the present invention.

FIG. 19 is a flowchart defining an example of an operation procedure performed when the film thickness of the measurement subject is calculated by the optical measurement apparatus according to Modification 1 of the first embodiment of the present invention.

As shown in FIG. 19, first, before starting in-line measurement of the transmittance distribution of the measurement subject S, the optical measurement apparatus 101 adjusts the direction in which the absorption axis of the polarizing plate 50 extends in each of the reception optical systems 20a and 20b so that a single peak that is not buried in the background appears in the power spectrum generated by performing arithmetic processing such as Fourier transform on the transmittance spectrum of the measurement subject S. Specifically, the optical measurement apparatus 101 sets the angle θa formed by a predetermined reference direction in a plane that is orthogonal to the light path of measurement light and the direction in which the absorption axis of the polarizing plate 50 in the reception optical system 20a extends, to be the angle θmax. Also, the optical measurement apparatus 101 sets the angle θa formed by a predetermined reference direction in a plane that is orthogonal to the light path of measurement light and the direction in which the absorption axis of the polarizing plate 50 in the reception optical system 20b extends, to be the angle (θmax+) 90° (step S102).

Next, after starting in-line measurement, the optical measurement apparatus 101 waits until a measurement point in time, which is a point in time at which measurement is to be performed (NO in step S104), and at the measurement point in time (YES in step S104), the optical measurement apparatus 101 irradiates the measurement subject S with irradiation light in a straight direction. Specifically, the optical measurement apparatus 101 uses the irradiation optical systems 10a and 10b to irradiate the measurement position M on the measurement subject S with irradiation light in a straight direction (step S106).

Next, the optical measurement apparatus 101 receives the measurement light travelling from the measurement subject S as a result of the measurement subject S being irradiated with irradiation light, and passing through the polarizing plate 50, i.e. transmission light. Specifically, the optical measurement apparatus 101 uses the reception optical systems 20a and 20b to receive transmission light passing through the measurement subject S (step S108).

Next, the optical measurement apparatus 101 calculates the transmittance spectra ST(λ) based on the result of reception of the measurement light. Specifically, the optical measurement apparatus 101 calculates the transmittance spectrum ST(λ) that is based on the result of reception of light by the reception optical system 20a and the transmittance spectrum ST(λ) that is based on the result of reception of light by the reception optical system 20b (step S110).

Next, the optical measurement apparatus 101 calculates the film thickness of the measurement subject S at the measurement position M based on the transmittance spectra ST(λ) thus calculated. Specifically, the optical measurement apparatus 101 determines the average of the film thickness Fmax1 calculated based on the result of reception of light by the reception optical system 20a and the film thickness Fmax2 calculated based on the result of reception of light by the reception optical system 20b as the film thickness of the measurement subject S at the measurement position M (step S112).

Note that, when the optical measurement apparatus 101 according to the first embodiment of the present invention uses the pair of irradiation optical system 10a and the reception optical system 20a to calculate the film thickness of the measurement subject, it is unnecessary to perform setting of the direction in which the absorption axis of the polarizing plate 50 extends in the reception optical system 20b (step S102), irradiation of irradiation light using the irradiation optical system 10b (step S106), reception of transmission light using the reception optical system 20b (step S108), or calculation of the transmittance spectrum ST(λ) that is based on the result of reception of light by the reception optical system 20b (step S110), and the film thickness Fmax1 calculated based on the result of reception of light by the reception optical system 20a can be determined as the film thickness of the measurement subject S at the measurement position M (step S112). Also, when the optical measurement apparatus 101 according to Modification 2 of the first embodiment of the present invention is used to calculate the film thickness of the measurement subject, the optical measurement apparatus 101 irradiates the measurement subject S with the irradiation light that has passed though the polarizing plate 50, in a straight direction, in step S106, and receives measurement light that has not passed through the polarizing plate 50, in step S108.

Figure 20:
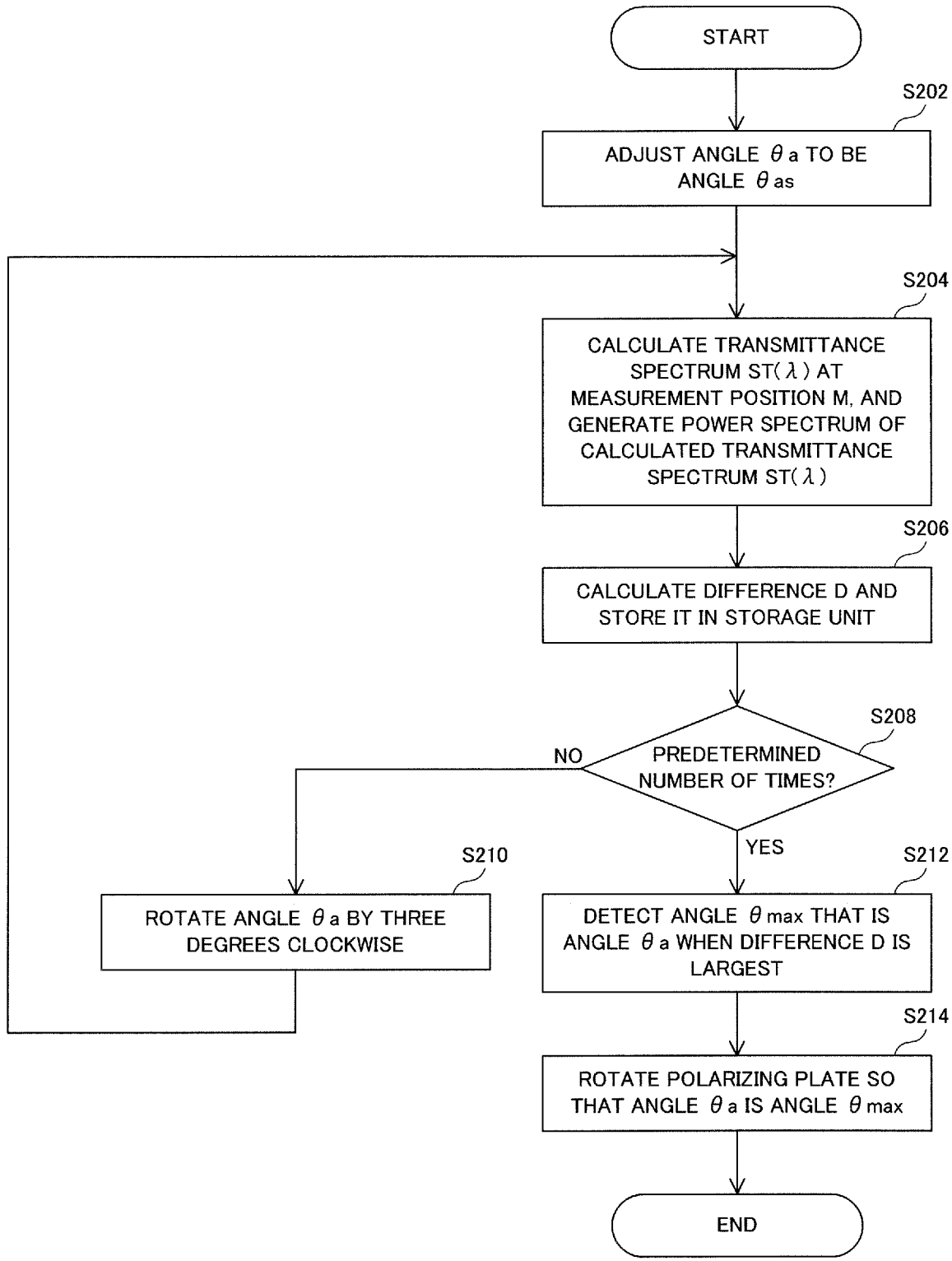
FIG. 20 is a flowchart defining an example of an operation procedure performed to adjust the direction in which the absorption axis of the polarizing plate extends in the optical measurement apparatus according to the first embodiment of the present invention.

FIG. 20 is a flowchart defining an example of an operation procedure performed to adjust the direction in which the absorption axis of the polarizing plate extends in the optical measurement apparatus according to the first embodiment of the present invention. FIG. 20 shows the details of step S102 in FIG. 19.

As shown in FIG. 20, first, the optical measurement apparatus 101 rotates the polarizing plate 50 to adjust the angle θa to be the angle θas that is the initial value (step S202).

Next, the optical measurement apparatus 101 calculates the transmittance spectrum ST(λ) at a certain measurement position M on the measurement subject S, and generates a power spectrum by performing arithmetic processing such as Fourier transform on the calculated transmittance spectrum ST(λ) (step S204).

Next, the optical measurement apparatus 101 calculates the difference D between the intensity of the largest peak and the intensity of the second largest peak of the generated power spectrum, and stores the calculated difference D in the storage unit 33 (step S206).

Next, if the number of times steps S204 and S206 have been performed is less than a predetermined number of times (NO in step S208), the optical measurement apparatus 101 adjusts the angle θa to be an angle rotated from it by three degrees clockwise, by rotating the polarizing plate 50 (step S210), and repeats steps S204 and S206.

Next, upon the number of times steps S204 and S206 have been performed reaching the predetermined number of times (YES in step S208), the optical measurement apparatus 101 detects the angle θmax that is the angle θa when the difference D is at the maximum value (step S212).

Next, the optical measurement apparatus 101 rotates the polarizing plate 50 so that the angle θa becomes the angle θmax (step S214).

Although the irradiation optical system 10 in the optical measurement apparatus 101 according to the first embodiment of the present invention is configured to irradiate the target area R that is a linear area across which the measurement subject S is moved, with irradiation light, the present invention is not limited to such a configuration. The irradiation optical system 10 may irradiate a dot-like target position with irradiation light.

Also, although the optical measurement apparatus 101 according to the first embodiment of the present invention is provided with the adjustment unit 51, the present invention is not limited to such a configuration. The optical measurement apparatus 101 may be configured without the adjustment unit 51. If this is the case, the direction in which the absorption axis of the polarizing plate 50 extends is fixed in advance so as to be parallel with the direction in which the slow axis Nx or the fast axis Ny of the measurement subject S extends in a plane that is orthogonal to the light path of measurement light, for example.

Also, although the adjustment unit 51 in the optical measurement apparatus 101 according to the first embodiment of the present invention is configured to adjust the direction in which the absorption axis of the polarizing plate 50 extends, according to a control signal received from the transmission unit 34, the present invention is not limited to such a configuration. The adjustment unit 51 does not necessarily perform automatic adjustment, and may have a mechanism with which the user can manually adjust the direction in which the absorption axis of the polarizing plate 50 extends. If this is the case, the user manually adjusts the angle θa in steps S202 and S210 in FIG. 20.

Although the polarizing plate 50 in the optical measurement apparatus 101 according to the first embodiment of the present invention is provided on the light path of measurement light from the target area R to the objective lens 21, the present invention is not limited to such a configuration. The polarizing plate 50 may be provided between the objective lens 21 and the slit portion 221, between the slit portion 221 and the first lens 222, or between the first lens 222 and the diffraction grating 223.

Although the polarizing plate 50 in the optical measurement apparatus 101 according to the first embodiment of the present invention is fixedly provided in only one of the irradiation optical system 10 and the reception optical system 20, the present invention is not limited to such a configuration.

For example, the optical measurement apparatus 101 may include a polarizing plate 50A that is a polarizing plate 50 provided in the irradiation optical system 10 and a polarizing plate 50B that is a polarizing plate 50 provided in the reception optical system 20. More specifically, the polarizing plate 50A is provided on a light path OP1 of the irradiation light from the line light guide 12 to the target area R, using a stand S1 that has a support clamp, for example, and the polarizing plate 50B is provided on a light path OP2 of the measurement light from the target area R to the objective lens 21, using a stand S2 that has a support clamp, for example. If this is the case, when starting the measurement of the film thickness of the measurement subject S, the user moves the polarizing plate 50A to a position outside the light path OP1, or the polarizing plate 50B to a position outside the light path OP2, according to the type or the like of the measurement subject S, for example. Note that the polarizing plate 50A or the polarizing plate 50B may be mounted on an actuator (not shown) that receives a control signal from the processing device 30, and configured to be automatically moved according to the operation of the actuator.

Also, for example, the optical measurement apparatus 101 may be provided with a polarizing plate 50C that is a moveable polarizing plate 50 provided in either one of the irradiation optical system 10 and the reception optical system 20. More specifically, the polarizing plate 50C is mounted on an actuator (not shown) that receives a control signal from the processing device 30, and is provided on the light path OP1 or the light path OP2 by being automatically moved between the light path OP1 and the light path OP2 according to the operation of the actuator. Note that the polarizing plate 50C may be configured to be located on the light path OP1 or at a predetermined position outside the light path OP1 by being automatically moved between a position on the light path OP1 and the predetermined position according to the operation of the actuator. Alternatively, the polarizing plate 50C may be configured to be located on the light path OP2 or at a predetermined position outside the light path OP2 by being automatically moved between a position on the light path OP2 and the predetermined position according to the operation of the actuator.

Next, other embodiments of the present invention will be described with reference to the drawings. Note that the same components or equivalent components in the drawings are assigned the same reference numerals, and descriptions thereof will not be repeated.

Second Embodiment

The present embodiment relates to an optical measurement apparatus 102 that uses light reflected from the target area R in contrast with the optical measurement apparatus 101 according to the first embodiment. The optical measurement apparatus 102 is the same as the optical measurement apparatus 101 according to the first embodiment except for the contents described below.

Optical Measurement Apparatus

Figure 21:
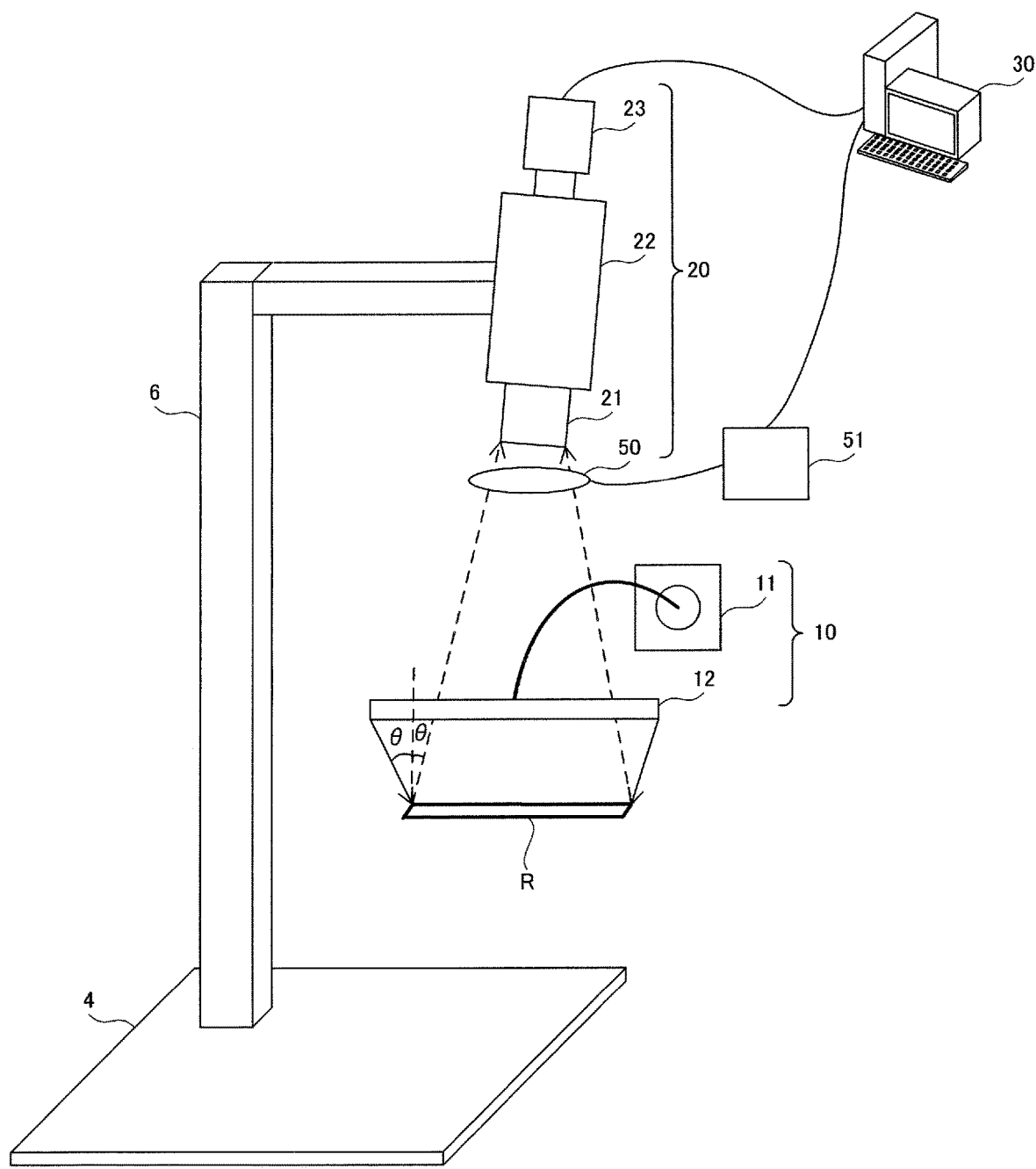
FIG. 21 is a diagram showing an example of the configuration of the optical measurement apparatus according to the second embodiment of the present invention.

FIG. 21 is a diagram showing an example of the configuration of the optical measurement apparatus according to the second embodiment of the present invention.

As shown in FIG. 21, the optical measurement apparatus 102 includes the irradiation optical system 10, the reception optical system 20, the processing device 30, the adjustment unit 51, the base member 4, the support member 6, and the polarizing plate 50. The base member 4 and the support member 6 fix the reception optical system 20. Note that the optical measurement apparatus 102 is not limited to having a configuration that includes the base member 4 and the support member 6, and may include other members for fixing the reception optical system 20 instead of the base member 4 and the support member 6 or in addition to the base member 4 and the support member 6.

The polarizing plate 50 is configured such that it can be provided in either the irradiation optical system 10 or the reception optical system 20. For example, the polarizing plate 50 is fixedly provided in only one of the irradiation optical system 10 and the reception optical system 20. In the example shown in FIG. 21, the polarizing plate 50 is fixedly provided only in the reception optical system 20.

Figure 22:
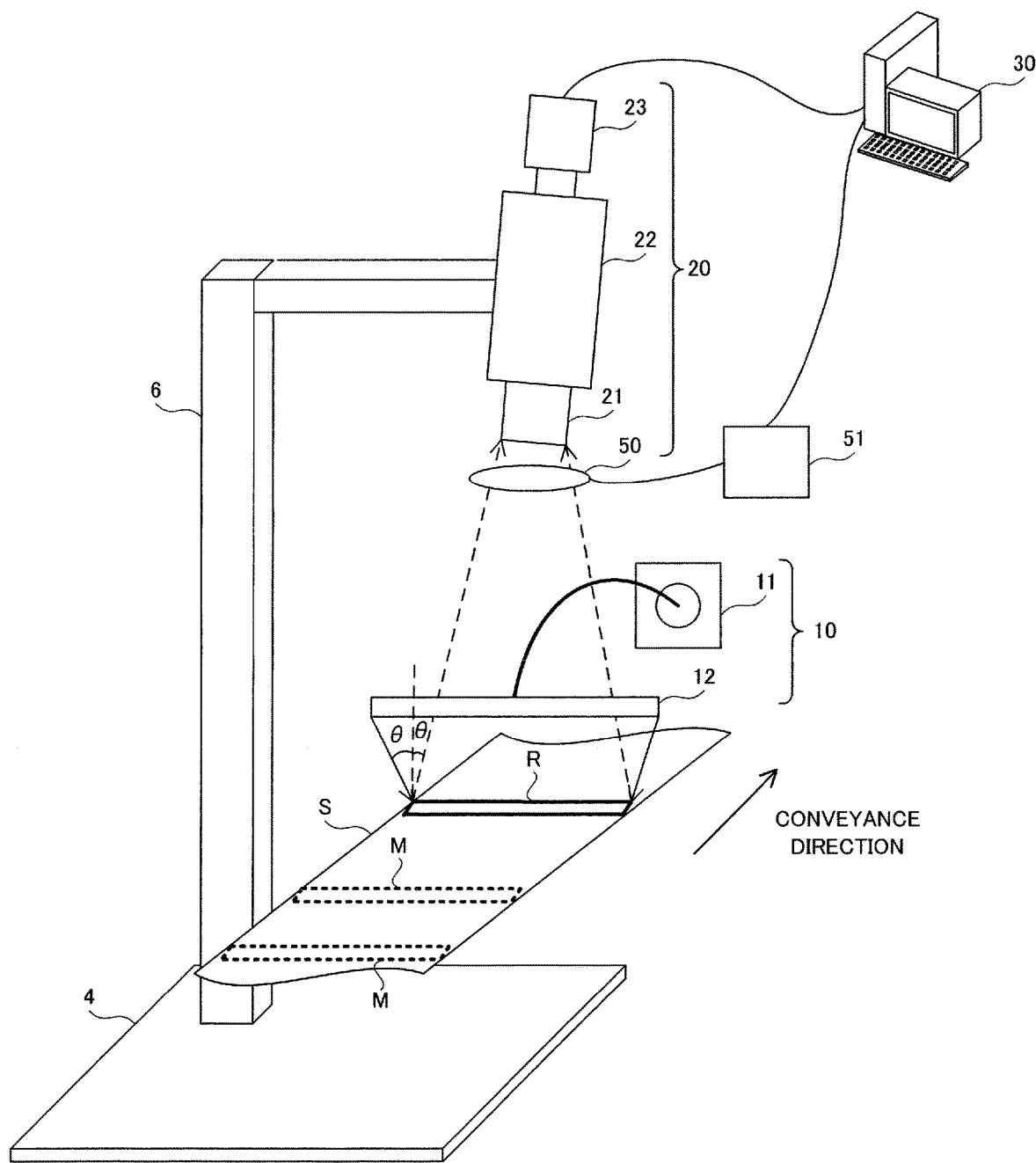
FIG. 22 is a diagram showing an example of the configuration of the optical measurement apparatus according to the second embodiment of the present invention.

FIG. 22 is a diagram showing an example of the configuration of the optical measurement apparatus according to the second embodiment of the present invention. FIG. 22 shows a state in which the measurement subject S that is the subject of measurement performed by the optical measurement apparatus 102 is placed.

As shown in FIG. 22, the optical measurement apparatus 102 measures the reflectance spectrum of the measurement subject S that is moved across the target area R.

For example, in a production line of the measurement subject S, the optical measurement apparatus 102 automatically measures the reflectance spectrum of the measurement subject S that is conveyed through the target area R, at a plurality of measurement positions M. That is to say, the optical measurement apparatus 102 performs in-line measurement of the reflectance spectrum at the plurality of measurement positions M on the measurement subject S.

More specifically, the optical measurement apparatus 102 periodically performs reflectance measurement, for example, to calculate the reflectance for each wavelength at the measurement positions M on the measurement subject S that is conveyed.

Irradiation Optical System

The irradiation optical system 10 irradiates the measurement subject S in a straight direction, with irradiation light that includes a plurality of wavelengths. More specifically, the irradiation optical system 10 irradiates, with irradiation light, a target area R that is a linear area across which the measurement subject S is moved.

The line light guide 12 of the irradiation optical system 10 is provided such that the incident angle of the irradiation light incident onto the measurement subject S moved across the target area R is 0.

Reception Optical System

The reception optical system 20 receives measurement light that is reflected light travelling from the measurement subject S as a result of the measurement subject S being irradiated with irradiation light.

The reception optical system 20 is located at a position that is on the same side as the line light guide 12 with respect to the measurement subject S and at which the reception optical system 20 can receive reflection light reflected from the measurement subject S at the reflection angle θ.

The reception optical system 20 includes the polarizing plate 50, the objective lens 21, the imaging spectroscope 22, and the imaging unit 23.

The polarizing plate 50 is located on the light path of measurement light from the target area R to the objective lens 21. The polarizing plate 50 has an absorption axis.

The reception optical system 20 receives, as measurement light, reflection light reflected from the measurement subject S, of the irradiation light emitted from the line light guide 12. Specifically, the reception optical system 20 receives reflection light reflected from the measurement subject S that is moved across the target area R, of the irradiation light emitted from the line light guide 12.

Processing Device

The calculation unit 32 of the processing device 30 generates a reception light spectrum S(λ) that indicates the relationship between a wavelength λ and the intensity of measurement light in the target area R, based on the result of reception of the measurement light performed by the reception optical system 20. Thereafter, the calculation unit 32 calculates, for each wavelength, the reflectance of the measurement subject S moved across the target area R, based on the reception light spectrum S(λ) thus generated.

More specifically, the calculation unit 32 generates the reception light spectrum S(λ) based on the two-dimensional image data stored in the storage unit 33, and calculates the reflectance of the measurement subject S for each wavelength A, based on the reception light spectrum S(λ) thus generated.

For example, in a state where a reflection plate is provided in the target area R, the calculation unit 32 calculates a reflectance spectrum SR(λ) of the measurement subject S, based on a criterion spectrum Srr(λ) that is a reception light spectrum S(λ) that is based on the measurement light travelling from the reflection plate provided in the target area R, and a measurement spectrum Srm(λ) that is a reception light spectrum S(λ) that is based on the measurement light travelling from the target area R when the measurement subject S is present.

For example, the calculation unit 32 calculates the film thickness of the measurement subject S based on the reflectance spectrum SR(λ) thus calculated. More specifically, the calculation unit 32 generates a power spectrum by performing arithmetic processing such as Fourier transform on the calculated reflectance spectrum SR(λ). Thereafter, the calculation unit 32 determines the optical film thickness corresponding to the peak wavelength of the generated power spectrum as the film thickness of the measurement subject S.

For example, the calculation unit 32 generates a plurality of criterion spectra Srr(λ) and a plurality of measurement spectra Srm(λ) for the measurement points X in the target area R respectively, and calculates a plurality of reflectance spectra SR(λ) for the measurement points X based on the generated criterion spectra Srr(λ) and measurement spectra Srm(λ) respectively. Thereafter, the calculation unit 32 generates the film thickness distribution that indicates the film thickness of the measurement subject S at the measurement points X, based on the reflectance spectra SR(λ) thus calculated.

Note that, in the optical measurement apparatus 102 according to the second embodiment of the present invention, as in the optical measurement apparatus 101 according to Modifications of the first embodiment of the present invention, the calculation unit 32 in the processing device 30 may be configured to calculate the film thickness of the measurement subject S based on the results of reception of measurement light in each of the cases where directions in which the absorption axis of the polarizing plate extends in a plane that intersects the light path of irradiation light are different.

Modification 1

Figure 23:
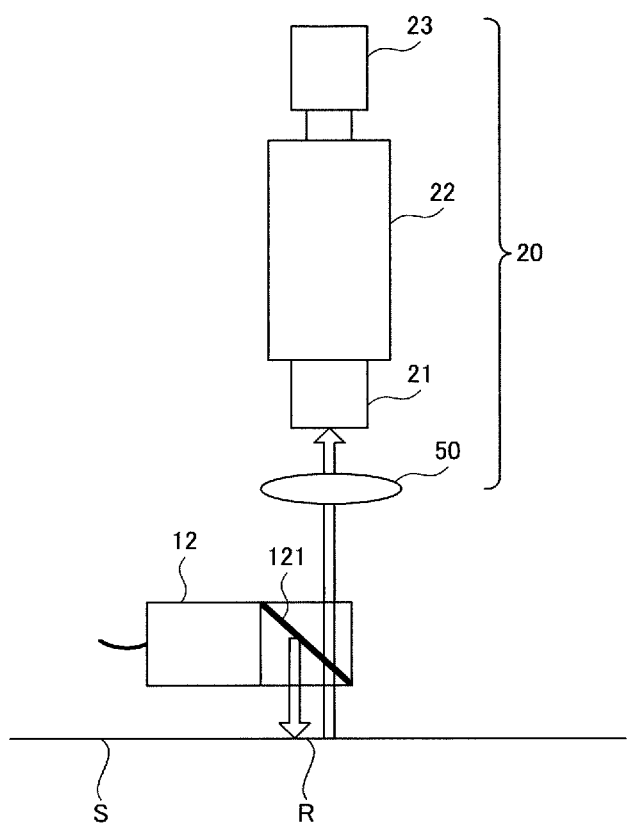
FIG. 23 is a diagram showing an example of the configuration of the optical measurement apparatus according to Modification 1 of the second embodiment of the present invention.

FIG. 23 is a diagram showing an example of the configuration of the optical measurement apparatus according to Modification 1 of the second embodiment of the present invention.

As shown in FIG. 23, the line light guide 12 has a half mirror 121. The line light guide 12 irradiates the target area R with the irradiation light reflected from the half mirror 121. In this case, for example, the line light guide 12 is provided immediately above the surface on which the measurement subject S is conveyed, such that the incident angle of the irradiation light incident onto the measurement subject S that is moved across the target area R is 0°. That is to say, the irradiation optical system 10 of the optical measurement apparatus 102 is a coaxial epi-illumination system.

The reception optical system 20 receives reflected light travelling from the measurement subject S as a result of the measurement subject S being irradiated with irradiation light, via the half mirror 121. In this case, for example, the reception optical system 20 is located at a position where the reception optical system 20 can receive the reflection light reflected from the measurement subject S at a reflection angle of 0°, i.e. at a position where the reception optical system 20 faces the target area R with the line light guide 12 being interposed therebetween.

Modification 2

Although the polarizing plate 50 in the optical measurement apparatus 102 according to the second embodiment of the present invention is fixedly provided only in the reception optical system 20, the present invention is not limited to such a configuration. The polarizing plate 50 may be fixedly provided only in the irradiation optical system 10.

Figure 24:
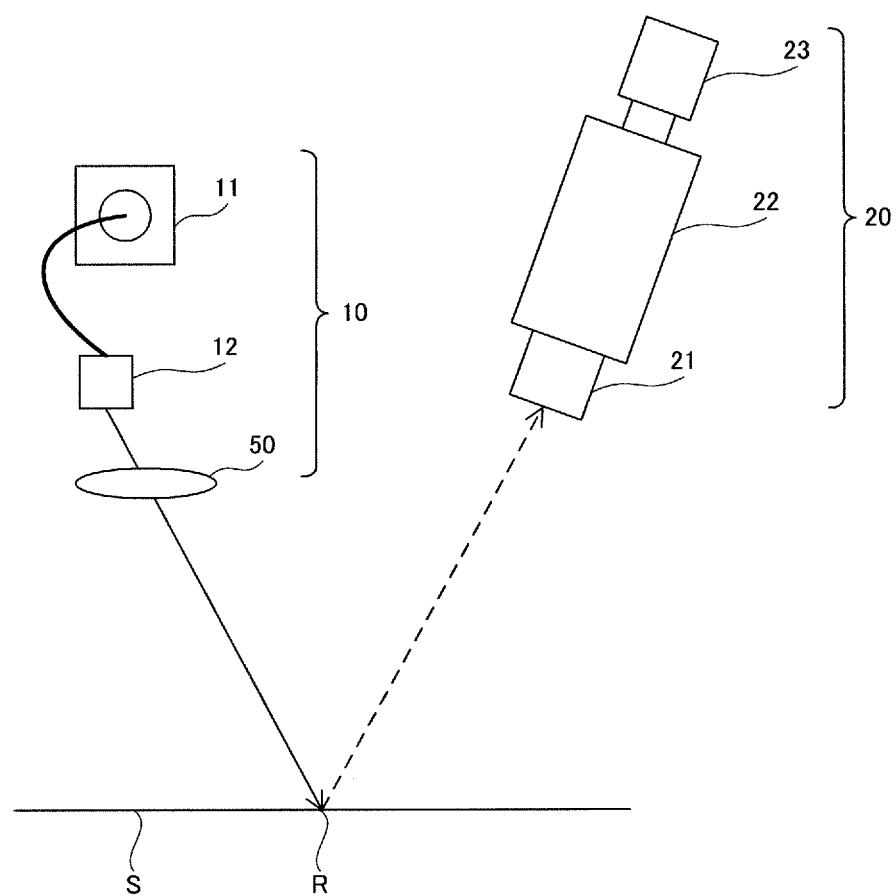
FIG. 24 is a diagram showing an example of the configuration of the irradiation optical system in the optical measurement apparatus according to a modification of the second embodiment of the present invention.

FIG. 24 is a diagram showing an example of the configuration of the irradiation optical system in the optical measurement apparatus according to a modification of the second embodiment of the present invention.

As shown in FIG. 24, in the optical measurement apparatus 102, the reception optical system 20 does not include the polarizing plate 50, whereas the irradiation optical system 10 includes the polarizing plate 50.

More specifically, the polarizing plate 50 is provided on the light path of irradiation light from the line light guide 12 to the target area R.

In the optical measurement apparatus 102 according to the second embodiment, the optical measurement apparatus 102 according to Modification 1, and the optical measurement apparatus 102 according to Modification 2 of the present invention, as in the optical measurement apparatus 101 according to the first embodiment of the present invention, it is possible to uniquely detect the largest peak pk in the generated power spectrum Pw, and it is possible to accurately measure the film thickness F of the measurement subject S corresponding to the peak pk.

The foregoing embodiments are to be construed in all respects as illustrative and not restrictive. The scope of the present invention is defined by the claims rather than the description above, and is intended to include all modifications within the meaning and scope of the claims and equivalents thereof.

What is claimed is:

1. An optical measurement apparatus comprising:
    an irradiation optical system configured to irradiate a measurement subject with irradiation light that includes a plurality of wavelengths;
    a reception optical system configured to receive measurement light that is transmission light or reflection light travelling from the measurement subject with birefringence as a result of the measurement subject being irradiated with the irradiation light;
    a polarizing plate; and
    an adjustment unit configured to adjust a direction in which an absorption axis of the polarizing plate extends in a plane that intersects a light path of the irradiation light or a light path of the measurement light, and
    wherein the polarizing plate is fixedly provided in only one of the irradiation optical system and the reception optical system, and
    the adjustment unit adjusts the direction in which the absorption axis of the polarizing plate extends, so that (a) an angle formed by the absorption axis of the polarizing plate and a slow axis of the measurement subject is within a range of −10 degrees to 10 degrees and an angle formed by the absorption axis of the polarizing plate and a fast axis of the measurement subject is within a range of 80 degrees to 100 degrees or (b) an angle formed by the absorption axis of the polarizing plate and a slow axis of the measurement subject is within a range of 80 degrees to 100 degrees and an angle formed by the absorption axis of the polarizing plate and a fast axis of the measurement subject is within a range of −10 degrees to 10 degrees.

2. An optical measurement method performed by using an optical measurement apparatus that includes an irradiation optical system and a reception optical system, the optical measurement method comprising:
    a step of irradiating a measurement subject with irradiation light that includes a plurality of wavelengths, by using the irradiation optical system;
    a step of receiving measurement light that is transmission light or reflection light travelling from the measurement subject with birefringence as a result of the measurement subject being irradiated with the irradiation light, by using the reception optical system; and
    a step of adjusting, by using an adjustment unit, a direction in which an absorption axis of a polarizing plate extends in a plane that intersects a light path of the irradiation light or a light path of the measurement light,
    wherein
    the adjustment unit adjusts the direction in which the absorption axis of the polarizing plate extends so that (a) an angle formed by the absorption axis of the polarizing plate and a slow axis of the measurement subject is within a range of −10 degrees to 10 degrees and an angle formed by the absorption axis of the polarizing plate and a fast axis of the measurement subject is within a range of 80 degrees to 100 degrees or (b) an angle formed by the absorption axis of the polarizing plate and a slow axis of the measurement subject is within a range of 80 degrees to 100 degrees and an angle formed by the absorption axis of the polarizing plate and a fast axis of the measurement subject is within a range of −10 degrees to 10 degrees, and
    in the step of irradiating the measurement subject with the irradiation light or the step of receiving the measurement light, the measurement subject is irradiated with the irradiation light passing through the polarizing plate, or the measurement light passing through the polarizing plate is received.

3. The optical measurement method according to claim 2, wherein the polarizing plate is fixedly provided in only one of the irradiation optical system and the reception optical system.

4. The optical measurement method according to claim 2, further comprising:
    a step of calculating a film thickness of the measurement subject based on a result of receiving the measurement light in each of cases where directions in which the absorption axis of the polarizing plate extends in a plane that intersects a light path of the irradiation light or the measurement light are different.

5. An optical measurement apparatus comprising:
an irradiation optical system configured to irradiate a measurement subject with irradiation light that includes a plurality of wavelengths;
a reception optical system configured to receive measurement light that is transmission light or reflection light travelling from the measurement subject with birefringence as a result of the measurement subject being irradiated with the irradiation light;
a first polarizing plate;
a second polarizing plate; and
a mechanism configured to change a position of the first polarizing plate and a position of the second polarizing plate,
wherein the first polarizing plate is configured to be moved between a position on a first light path in the irradiation optical system and a position outside the first light path by the mechanism, wherein the mechanism is configured to adjust a direction in which an absorption axis of the first polarizing plate extends in a plane that intersects the first light path of the irradiation light,
the second polarizing plate is configured to be moved between a position on a second light path in the reception optical system and a position outside the second light path by the mechanism, wherein the mechanism is configured to adjust a direction in which an absorption axis of the second polarizing plate extends in a plane that intersects the second light path of the measurement light,
when starting a measurement by using the optical measurement apparatus, (a) the first polarizing plate is moved to the position on the first light path by the mechanism, and the second polarizing plate is moved to the position outside the second light path by the mechanism, or (b) the first polarizing plate is moved to the position outside the first light path by the mechanism, and the second polarizing plate is moved to the position on the second light path by the mechanism,
the mechanism adjusts the direction in which the absorption axis of the first polarizing plate extends, so that (a) an angle formed by the absorption axis of the first polarizing plate and a slow axis of the measurement subject is within a range of −10 degrees to 10 degrees and an angle formed by the absorption axis of the first polarizing plate and a fast axis of the measurement subject is within a range of 80 degrees to 100 degrees or (b) an angle formed by the absorption axis of the first polarizing plate and a slow axis of the measurement subject is within a range of 80 degrees to 100 degrees and an angle formed by the absorption axis of the first polarizing plate and a fast axis of the measurement subject is within a range of −10 degrees to 10 degrees,
the mechanism adjusts the direction in which the absorption axis of the second polarizing plate extends, so that (c) an angle formed by the absorption axis of the second polarizing plate and a slow axis of the measurement subject is within a range of −10 degrees to 10 degrees and an angle formed by the absorption axis of the second polarizing plate and a fast axis of the measurement subject is within a range of 80 degrees to 100 degrees or (d) an angle formed by the absorption axis of the second polarizing plate and a slow axis of the measurement subject is within a range of 80 degrees to 100 degrees and an angle formed by the absorption axis of the second polarizing plate and a fast axis of the measurement subject is within a range of −10 degrees to 10 degrees.

6. An optical measurement apparatus comprising:
an irradiation optical system configured to irradiate a measurement subject with irradiation light that includes a plurality of wavelengths;
a reception optical system configured to receive measurement light that is transmission light or reflection light travelling from the measurement subject with birefringence as a result of the measurement subject being irradiated with the irradiation light;
a polarizing plate; and
a mechanism configured to change a position of the polarizing plate, wherein the mechanism is configured to adjust a direction in which an absorption axis of the polarizing plate extends in a plane that intersects a light path of the irradiation light or a light path of the measurement light,
wherein the polarizing plate is configured to be moved between at least two of (a) a position on a first light path in the irradiation optical system, (b) a position on a second light path in the reception optical system, and (c) a position outside the first and second light path, by the mechanism,
when starting a measurement by using the optical measurement apparatus, the polarizing plate is moved to the position on the first light path or the position on the second light path by the mechanism,
the mechanism adjusts the direction in which the absorption axis of the polarizing plate extends, so that (a) an angle formed by the absorption axis of the polarizing plate and a slow axis of the measurement subject is within a range of −10 degrees to 10 degrees and an angle formed by the absorption axis of the polarizing plate and a fast axis of the measurement subject is within a range of 80 degrees to 100 degrees or (b) an angle formed by the absorption axis of the polarizing plate and a slow axis of the measurement subject is within a range of 80 degrees to 100 degrees and an angle formed by the absorption axis of the polarizing plate and a fast axis of the measurement subject is within a range of −10 degrees to 10 degrees.

* * * * *